(12) United States Patent
Smialowska et al.

(10) Patent No.: US 12,495,811 B2
(45) Date of Patent: Dec. 16, 2025

(54) DAIRY PRODUCT AND PROCESS

(71) Applicant: FONTERRA CO-OPERATIVE GROUP LIMITED, Auckland City (NZ)

(72) Inventors: Alice Matgorzata Smialowska, Auckland City (NZ); Jonathan Alfred Depree, Auckland City (NZ); Mark Pritchard, Auckland City (NZ)

(73) Assignee: FONTERRA CO-OPERATIVE GROUP LIMITED, Auckland City (NZ)

( * ) Notice: Subject to any disclaimer, the term of this patent is extended or adjusted under 35 U.S.C. 154(b) by 956 days.

(21) Appl. No.: 17/594,078

(22) PCT Filed: Apr. 18, 2020

(86) PCT No.: PCT/IB2020/053690
§ 371 (c)(1),
(2) Date: Oct. 1, 2021

(87) PCT Pub. No.: WO2020/212954
PCT Pub. Date: Oct. 22, 2020

(65) Prior Publication Data
US 2022/0174970 A1 Jun. 9, 2022

(30) Foreign Application Priority Data
Apr. 18, 2019 (AU) .................. 2019901348

(51) Int. Cl.
*A23C 9/142* (2006.01)
*A23B 11/13* (2025.01)
(Continued)

(52) U.S. Cl.
CPC ............ *A23C 9/1422* (2013.01); *A23B 11/13* (2025.01); *A23C 9/123* (2013.01); *A23C 9/1307* (2013.01);
(Continued)

(58) Field of Classification Search
CPC .. A23C 3/02; A23C 3/03; A23C 9/005; A23C 9/123; A23C 9/1307; A23C 9/14;
(Continued)

(56) References Cited

U.S. PATENT DOCUMENTS 5,503,865 A 4/1996 Behringer et al.
7,829,130 B2 11/2010 Tossavainen et al.
(Continued)

FOREIGN PATENT DOCUMENTS

EP 2183975 A2 5/2010
JP 2010-099070 A 5/2010
(Continued)

OTHER PUBLICATIONS

Heid, Markham; "Protect your health with the right dietary fats"; The University of Texas MD Anderson Cancer Center; Jun. 2015; https://www.mdanderson.org/publications/focused-on-health/FOH-dietary-fats.h15-1589835.html (Year: 2015).*
(Continued)

*Primary Examiner* — Drew E Becker
*Assistant Examiner* — Austin Parker Taylor
(74) *Attorney, Agent, or Firm* — KNOBBE, MARTENS, OLSON, BEAR, LLP

(57) ABSTRACT

The description relates to food products comprising heat-treated liquid milk protein concentrates, and methods of producing and using these milk protein concentrates and food products. In particular, methods for preparing protein-containing food products are described, comprising providing a heat-treated, liquid milk protein concentrate that has
(Continued)

been produced directly from fresh, liquid milk, the milk protein concentrate comprising at least about 6 % total protein by weight, preferably up to about 25 % total protein by weight, and at least about 50 % total protein by weight relative to total solids non-fat, wherein the milk protein concentrate after storage for at least about three months at a temperature of about 20° C. has no apparent gelation, and mixing the milk protein concentrate with one or more additional ingredients to produce the protein-containing food product.

12 Claims, 2 Drawing Sheets

(51) Int. Cl.
| | |
|---|---|
| *A23C 9/123* | (2006.01) |
| *A23C 9/13* | (2006.01) |
| *A23C 19/05* | (2006.01) |
| *A23L 2/66* | (2006.01) |
| *A23L 9/10* | (2016.01) |
| *A23L 33/115* | (2016.01) |
| *A23L 33/125* | (2016.01) |
| *A23L 33/19* | (2016.01) |

(52) U.S. Cl.
CPC .............. *A23C 19/053* (2013.01); *A23L 2/66* (2013.01); *A23L 9/10* (2016.08); *A23L 33/115* (2016.08); *A23L 33/125* (2016.08); *A23L 33/19* (2016.08); *A23V 2002/00* (2013.01)

(58) Field of Classification Search
CPC ..... A23C 9/142; A23C 9/1422; A23C 9/1425; A23C 19/053; A23L 2/66; A23L 33/115; A23L 33/125; A23L 33/19; A23L 9/10
USPC .......................................................... 426/42
See application file for complete search history.

(56) References Cited

U.S. PATENT DOCUMENTS

| | | | |
|---|---|---|---|
| 8,236,362 B2 | 8/2012 | Cale et al. | |
| 8,613,967 B2 | 12/2013 | Cale et al. | |
| 2001/0026825 A1* | 10/2001 | Reaves ................ | A23C 9/1544 426/399 |
| 2003/0203042 A1* | 10/2003 | Cook ...................... | A23L 7/126 514/5.5 |
| 2004/0067296 A1 | 4/2004 | Loh et al. | |
| 2004/0224069 A1* | 11/2004 | Aird .................... | A23C 19/0917 426/582 |
| 2007/0020372 A1 | 1/2007 | Loh et al. | |
| 2007/0172548 A1* | 7/2007 | Cale ......................... | A23C 1/16 426/36 |
| 2008/0160134 A1* | 7/2008 | Hestekin .............. | A23C 9/1422 426/43 |
| 2009/0311410 A1* | 12/2009 | Burling .................... | A23J 1/20 426/657 |
| 2010/0104711 A1 | 4/2010 | Kimmel et al. | |
| 2010/0112128 A1* | 5/2010 | Kimmel ................ | A23C 9/1522 426/587 |
| 2013/0011515 A1* | 1/2013 | Knights .................. | A23L 33/19 426/573 |
| 2013/0196030 A1 | 8/2013 | Criezis et al. | |
| 2013/0287892 A1 | 10/2013 | Knights | |
| 2013/0330460 A1 | 12/2013 | Criezis et al. | |
| 2014/0314851 A1* | 10/2014 | Gulla ...................... | A23L 33/40 426/520 |
| 2016/0255850 A1 | 9/2016 | Gregg-Albers et al. | |
| 2016/0255851 A1 | 9/2016 | Gregg et al. | |
| 2017/0164645 A1* | 6/2017 | Bhaskar .................. | A23L 33/40 |
| 2018/0343881 A1 | 12/2018 | Demmer | |

FOREIGN PATENT DOCUMENTS

| | | |
|---|---|---|
| JP | 2018-074915 A | 5/2018 |
| WO | WO 2015/079108 A1 | 6/2015 |
| WO | WO 2016/174651 A2 | 11/2016 |
| WO | WO 2017/151770 A1 | 9/2017 |

OTHER PUBLICATIONS

Ware, Megan; "How to get enough protein"; Medical News Today; Sep. 26, 2017; https://www.medicalnewstoday.com/articles/310118 (Year: 2017).*
Davoodi SH, Shahbazi R, Esmaeili S, Sohrabvandi S, Mortazavian A, Jazayeri S, Taslimi A. Health-Related Aspects of Milk Proteins. Iran J Pharm Res. 2016 Summer;15(3):573-591. PMID: 27980594; PMCID: PMC5149046. https://pmc.ncbi.nlm.nih.gov/articles/PMC5149046/ (Year: 2016).*
Agarwal, S., Beausire, R.L.W., Patel, S. and Patel, H. (2015), Innovative Uses of Milk Protein Concentrates in Product Development. Journal of Food Science, 80: A23-A29. https://doi.org/10.1111/1750-3841.12807 (Year: 2015).*
Carter et al (2018) "The effect of spray drying on the difference in flavor and functional properties of liquid and dried whey proteins, milk proteins, and micellar casein concentrates", J. Dairy Sci., 101(5):3900-3909.
Amelia et al., "Production of an 18% protein liquid micellar casein concentrate with a long refrigerated shelf life", Journal of Dairy Science, 96(5):3340-3349 (2013).
Bienvenue et al., "Rheological Properties of Concentrated Skim Milk: Importance of Soluble Minerals in the Changes in Viscosity During Storage", Journal of Dairy Science, 86(12):3813-3821 (2003).
Crowley et al., "Heat stability of reconstituted milk protein concentrate powders", International Dairy Journal, 37:104-110 (2014).
Hinrichs, "UHT processed milk concentrates", Lait, INRA, EDP Sciences, 80:15-23 (2000).
McMahon, "Age-gelation of UHT milk: changes that occur during storage, their effect on shelf life and the mechanism by which age-gelation occurs", International Dairy Federation, pp. 315-326 (1995).
Ranjith, "Assessment of some properties of calcium-reduced milk and milk products from heat treatment and other processes", University of Reading, pp. 1-276 (1995).
Singh et al., "Comparison of ultra high temperature (UHT) stability of high protein milk dispersions prepared from milk protein concentrate (MPC) and conventional low heat skimmed milk powder (SMP)", Journal of Food Engineering, 246:86-94 (2019).
Sweetsur et al., "Effects of concentration by ultrafiltration on the heat stability of skim-milk", Journal of Dairy Research, 47:327-335 (1980).
Syrios et al., "A comparison of reverse osmosis, nanofiltration and ultrafiltration as concentration processes for skim milk prior to drying", International Journal of Dairy Technology, 64(4):467-472 (2011).
Office Action issued in Japanese application No. JP2021561033A on Mar. 29, 2024.

* cited by examiner

DAIRY PRODUCT AND PROCESS

FIELD OF THE INVENTION

The present invention relates to high protein food products comprising liquid milk protein concentrates and methods for their preparation and use.

BACKGROUND TO THE INVENTION

High-protein foods, such as dairy, sports and medical beverages or cultured products or cheese, can be made by adding an ingredient with a high-protein content to a milk base or to some other composition. Desirable properties of a high-protein dairy ingredient include:
- a bland flavour,
- a high concentration of protein and the absence of additives such as stabilisers or sweeteners in order to provide formulation flexibility,
- low lactose content, either for nutritional reasons or to avoid problems such as browning in the high protein food, and
- ease of mixing with the rest of the ingredients in the high protein food.

High-protein dairy ingredients include milk protein concentrates, whey protein concentrates and caseinates.

Milk protein concentrates (MPCs) are milk products processed to higher protein contents than typically occur in milk. Most MPCs are defined by describing the percentage of milk protein within the dry matter. For example, MPC85 contains at least 85% milk protein per 100 parts of dry matter. Generally, MPCs are prepared by processes invoking ultrafiltration or microfiltration to concentrate the protein concentration while simultaneously removing lactose and membrane-permeable minerals thereby producing a retentate stream. Optionally MPCs are also prepared by subjecting the ultrafiltered or microfiltered retentate to diafiltration and optionally concentrating or drying the retentate.

MPCs have traditionally been supplied to producers of high-protein foods in one of two ways:
1) Where a local source of fresh milk is available, the milk is ultrafiltered or microfiltered to provide a retentate that can be stored chilled for up to a week, after which they typically spoil by forming a gel. However, many producers of high protein foods either do not have access to cost-effective sources of fresh milk or do not want to invest in the equipment for the manufacture of MPCs.
2) MPCs may be provided by spray drying the ultrafiltered or microfiltered retentate to make an MPC powder. However, high protein food products prepared from powdered MPCs may have undesirable flavours as a result of the drying step or as a result of storage of the MPC in that dried state. High protein food products prepared from powdered MPCs also require high shear mixing, typically in hot water, in order to redissolve the powder.

There is therefore a need for alternative milk protein concentrates having a high concentration of protein, a commercially useful shelf life, acceptable or improved flavour, and/or that are easier to incorporate into food products.

It is an object of the present invention to provide improved or alternative liquid milk protein concentrates, or to at least provide the public with a useful choice.

SUMMARY OF THE INVENTION

In one aspect, the invention provides a method for preparing a protein-containing food product, the method comprising a) providing a heat-treated, liquid milk protein concentrate that has been produced directly from fresh, liquid milk, the milk protein concentrate comprising
  i) at least about 6% total protein by weight, preferably up to about 25% total protein by weight, and
  ii) at least about 50% total protein by weight relative to total solids non-fat, wherein the milk protein concentrate after storage for at least about three months at a temperature of about 20° C. has no apparent gelation, and
b) mixing the milk protein concentrate with one or more additional ingredients to produce the protein-containing food product.

In one aspect, the invention provides a method for preparing a protein-containing food product, the method comprising a) providing a heat-treated, liquid milk protein concentrate that has been produced directly from fresh, liquid milk, the milk protein concentrate comprising
  i) at least about 9% total protein by weight, and
  ii) at least about 60% total protein by weight relative to total solids non-fat, wherein the milk protein concentrate after storage for at least about three months at a temperature of about 20° C. has no apparent gelation, and
b) mixing the milk protein concentrate with one or more additional ingredients to produce the protein-containing food product.

In one aspect, the invention provides a method for preparing a protein-containing food product, the method comprising a) providing a heat-treated, liquid milk protein concentrate that has been produced directly from fresh, liquid milk, the milk protein concentrate comprising at least about 9% total protein by weight, and wherein the milk protein concentrate after storage for at least about one, two or three months at a temperature of about 20° C.
  i) exhibits essentially no observable gelation or aggregation,
  ii) comprises less than about 5% by weight sediment,
  iii) has a whiteness index value of at least about 70,
  iv) has a viscosity of less than about 950 mPa·s when measured at a temperature of 20° C. and a shear rate of 100 s$^{-1}$, or
  v) a combination of any two or more of, or all of, i) to iv), and
b) mixing the milk protein concentrate with one or more additional ingredients to produce the protein-containing food product.

In various embodiments, the method may comprise holding the milk protein concentrate at a temperature of at least about 10° C. for at least about 3 days.

In various embodiments, the milk protein concentrate may be subjected to a heat treatment having an $F_0$ value of at least 3.0.

In various embodiments, the milk protein concentrate may be subjected to a heat treatment having an $F_0$ value of at least 6.0. In various embodiments, the milk protein concentrate has been subjected to a heat treatment having an $F_0$ value of at least 9.0.

In various embodiments, the milk protein concentrate may be prepared by a method comprising subjecting fresh liquid milk to ultrafiltration or microfiltration to produce a retentate.

In various embodiments the fresh liquid milk is not subjected to a heat treatment equal to or greater than 80° C. or 81° C. prior to ultrafiltration or microfiltration.

In various embodiments, the method may comprise subjecting the retentate to a heat treatment having an $F_0$ value of at least 3.0 to prepare the milk protein concentrate.

In various embodiments, the milk protein concentrate is not reconstituted.

In various embodiments, the milk protein concentrate after storage for at least about one, two or three months at a temperature of about 20° C.
 i) exhibits essentially no observable gelation or aggregation,
 ii) comprises less than about 5% by weight sediment,
 iii) has a whiteness index value of at least about 70, or
 iv) any combination of any two or more, or all of (i) to (iii).

In various embodiments, the protein-containing food product may comprise at least about 1%, 1.5%, 2% or 2.5% total protein by weight.

In various embodiments, the one or more additional ingredients may comprise a lipid, a carbohydrate, flavour, vitamin, mineral, fibre, thickening agent, emulsifier, stabiliser, food additive, colour, protein, or any combination of two or more of these ingredients.

In various embodiments, the protein-containing food product may be a liquid nutritional composition, a beverage, ice cream, acidified/fermented milk, cheese, a pudding, a frozen dessert, coffee whitener, foam layer in a biscuit or in chocolate, a cream, or a gel.

In various embodiments, the cheese may be a fresh cheese or a processed cheese.

In various embodiments, the cheese may be a fresh cheese.

In various embodiments, the cheese may be cream cheese, quark, petit suisse, fromage frais, queso panela, queso fresco, paneer, or cottage cheese.

In one embodiment, the processed cheese may be a processed cream cheese.

In one embodiment the fermented milk may be a yoghurt.

In various embodiments the beverage may be a dairy beverage or sports beverage. In various embodiments the dairy beverage may be a liquid nutritional composition, a low lactose milk, a flavoured milk or a fortified milk.

In a further aspect, the invention provides use of a heat-treated, liquid milk protein concentrate that has been produced directly from fresh liquid milk in the preparation of a protein-containing food product, the milk protein concentrate comprising
 a) at least about 6% total protein by weight, and
 b) at least about 50% total protein by weight relative to total solids non-fat, wherein the milk protein concentrate after storage for at least about three months at a temperature of about 20° C. has no apparent gelation.

In a further aspect, the invention provides use of a heat-treated, liquid milk protein concentrate that has been produced directly from fresh liquid milk in the preparation of a protein-containing food product, the milk protein concentrate comprising
 a) at least about 9% total protein by weight, and
 b) at least about 60% total protein by weight relative to total solids non-fat,
wherein the milk protein concentrate after storage for at least about three months at a temperature of about 20° C. has no apparent gelation.

In a further aspect, the invention provides use of a heat-treated, liquid milk protein concentrate that has been produced directly from fresh liquid milk in the preparation of a protein-containing food product, the milk protein concentrate comprising at least about 9% total protein by weight, wherein the milk protein concentrate after storage for at least about one, two or three months at a temperature of about 20° C.
 i) exhibits essentially no observable gelation or aggregation,
 ii) comprises less than about 5% by weight sediment,
 iii) has a whiteness index value of at least about 70,
 iv) has a viscosity of less than about 950 mPa·s when measured at a temperature of 20° C. and a shear rate of 100 $s^1$, or
 v) a combination of any two or more of, or all of, i) to iv).

In a further aspect, the invention provides a method of preparing a liquid milk protein concentrate, the method comprising
 a) providing a composition comprising casein and whey protein,
 b) subjecting the composition to microfiltration or ultrafiltration to produce a retentate, and
 c) subjecting the retentate to a heat treatment having an $F_0$ value of at least 3.0 to prepare a milk protein concentrate comprising at least about 13.8% total protein by weight, or comprising less than about 13.8% total protein by weight and at least about 75% total protein by weight relative to total solids non-fat,
wherein the milk protein concentrate after storage for at least about three months at a temperature of about 20° C. has no apparent gelation.

In a further aspect, the invention provides a method of preparing a liquid milk protein concentrate, the method comprising
 a) providing a composition comprising casein and whey protein,
 b) subjecting the composition to microfiltration or ultrafiltration to produce a retentate, and
 c) subjecting the retentate to a heat treatment having an $F_0$ value of at least 3.0 to prepare a milk protein concentrate
 the milk protein concentrate comprising at least about 13.8% total protein by weight, or comprising less than about 13.8% total protein by weight and at least about 75% total protein by weight relative to total solids non-fat,
wherein the milk protein concentrate after storage for at least about three months at a temperature of about 20° C. has no apparent gelation.

In a further aspect, the invention provides a method of preparing a liquid milk protein concentrate, the method comprising
 a) providing a composition comprising casein and whey protein,
 b) subjecting the composition to microfiltration or ultrafiltration to produce a retentate, and
 c) subjecting the retentate to a heat treatment having an $F_0$ value of at least 3.0 to prepare a milk protein concentrate
 the milk protein concentrate comprising at least about 13.8% total protein by weight, or comprising less than about 13.8% total protein by weight and at least about 50% total protein by weight relative to total solids non-fat,
wherein the milk protein concentrate after storage for at least about one, two or three months at a temperature of about 20° C.
 i) exhibits essentially no observable gelation or aggregation,
 ii) comprises less than about 5% by weight sediment,
 iii) has a whiteness index value of at least about 70, iv) has a viscosity of less than about 950 mPa·s when measured at a temperature of 20° C. and a shear rate of 100 s-1, or v) a combination of any two or more of, or all of, i) to iv).

In various embodiments, the milk protein concentrate after storage for at least about one, two or three months at a temperature of about 20° C.

i) exhibits essentially no observable gelation or aggregation, ii) comprises less than about 5% by weight sediment, iii) has a whiteness index value of at least about 70, or iv) any combination of any two or more, or all of (i) to (iii).

In various embodiments, the composition comprising casein and whey protein is fresh milk.

In various embodiments, the composition comprising casein and whey protein is whole milk or skim milk.

In various embodiments the method may comprise subjecting the composition to microfiltration or ultrafiltration or a combination thereof.

In one embodiment, the method comprises subjecting the composition to ultrafiltration to produce an ultrafiltration retentate and subjecting the ultrafiltration retentate to microfiltration to produce the retentate. In another embodiment, the method comprises subjecting the composition to microfiltration to produce a microfiltration retentate and subjecting the microfiltration retentate to ultrafiltration to produce the retentate.

In various embodiments the method comprises i) subjecting a first composition comprising casein and whey protein to ultrafiltration to produce an ultrafiltration retentate, ii) subjecting a second composition comprising casein and whey protein to microfiltration to produce a microfiltration retentate, and iii) combining the ultrafiltration retentate and microfiltration retentate to produce a retentate.

In various embodiments, the retentate may be subjected to diafiltration to produce a diafiltered retentate before heat treatment.

In various embodiments the diafiltered retentate may be subjected to evaporation to produce a concentrated retentate before heat treatment.

In various embodiments, the method may comprise directly subjecting the retentate, diafiltered retentate, or concentrated retentate to the heat treatment.

In various embodiments the milk protein concentrate does not comprise added non-dairy ingredients.

In various embodiments, the milk protein concentrate may not comprise added stabilisers, mouthfeel enhancers, emulsifiers, thickeners or sweeteners.

In various embodiments, the milk protein concentrate may comprise at least about 6%, 9%, 10%, 11%, 12%, 13%, 14%, 14.5%, 15%, 15.5%, or 16% total protein by weight.

In various embodiments, the milk protein concentrate may comprise from about 6% to about 25% total protein by weight.

In various embodiments the milk protein concentrate may comprise from about 6% to about 24%, 6% to about 23%, about 9% to about 25%, about 9% to about 24%, about 9% to about 23% or about 9% to about 22% total protein by weight.

In various embodiments, the retentate may comprise at least about 15%, 20%, 25%, 30%, 35%, 40%, 45%, 50%, 55%, 60%, 65% or 75% by weight total solids non-fat.

In various embodiments, the retentate may comprise at least about 55%, 60%, 65% or 75% total protein by weight relative to total solids non-fat.

In various embodiments, the milk protein concentrate may be packed to produce a packed milk protein concentrate comprising at least about 13.8% total protein by weight, or comprising less than about 13.8% total protein by weight and at least about 75% total protein by weight relative to total solids non-fat.

In various embodiments, the milk protein concentrate after storage for at least about one, two or three months at a temperature of about 4° C.

i) exhibits essentially no observable gelation or aggregation, v) comprises less than about 5% by weight sediment, vi) has a whiteness index value of at least about 70, or vii) any combination of any two or more, or all of (i) to (iii).

In various embodiments, the milk protein concentrate after storage for at least one, two or three months at a temperature of about 20° C.

i) exhibits essentially no observable gelation or aggregation, ii) comprises less than about 5% by weight sediment, iii) has a whiteness index value of at least about 70, or iv) any combination of any two or more, or all of (i) to (iii).

In various embodiments, the milk protein concentrate after storage for at least about one, two or three months at a temperature of about 30° C.

i) exhibits essentially no observable gelation or aggregation, v) comprises less than about 5% by weight sediment, vi) has a whiteness index value of at least about 70, or vii) any combination of any two or more, or all of (i) to (iii).

In various embodiments, the milk protein concentrate after storage for at least about one, two or three months storage at a temperature of about 4° C., 20° C. or 30° C. has a viscosity of less than about 950 mPa·s when measured at a temperature of 20° C. and a shear rate of 100 s$^{-1}$.

In a further aspect, the invention provides heat-treated, shelf stable liquid milk protein concentrate produced by a method described herein.

In a further aspect, the invention provides a heat-treated, shelf stable liquid milk protein concentrate, the concentrate comprising a microfiltration or ultrafiltration retentate, or a combination thereof, wherein the milk protein concentrate a) comprises at least about 13.8% total protein by weight, or less than about 13.8% total protein by weight and at least about 75% total protein by weight relative to total solids non-fat, and b) after storage for at least three months at a temperature of about 20° C. has no apparent gelation.

In a further aspect, the invention provides a heat-treated, shelf stable liquid milk protein concentrate, the concentrate comprising a microfiltration or ultrafiltration retentate, or a combination thereof, wherein the milk protein concentrate b) comprises at least about 13.8% total protein by weight, or less than about 13.8% total protein by weight and at least about 50% total protein by weight relative to total solids non-fat, and c) after storage for at least one, two or three months at a temperature of about 20° C.

i) exhibits essentially no observable gelation or aggregation, ii) comprises less than about 5% by weight sediment, iii) has a whiteness index value of at least about 70,
iv) has a viscosity of less than about 950 mPa·s when measured at a temperature of 20° C. and a shear rate of 100 s$^{-1}$, or
v) a combination of any two or more of, or all of, i) to iv).

In various embodiments, the milk protein concentrate may comprise at least about 55%, 60%, 65% or 75% by weight total protein relative to total solids non-fat.

In a further aspect, the invention provides a method for preparing a liquid nutritional composition, the method comprising
a) providing a heat-treated, liquid milk protein concentrate that has been produced directly from fresh liquid milk, the milk protein concentrate comprising
i) at least about 13.8% total protein by weight, or
ii) comprising less than about 13.8% total protein by weight and at least about 75% total protein by weight relative to total solids non-fat,
wherein the milk protein concentrate after storage for at least about three months at a temperature of about 20° C. has no apparent gelation,
b) mixing the milk protein concentrate with at least one source of lipid and at least one source of carbohydrate to prepare the liquid nutritional composition.

In a further aspect, the invention provides a liquid nutritional composition comprising
a) a heat-treated, liquid milk protein concentrate that has been produced directly from fresh liquid milk, the milk protein concentrate comprising
i) at least about 13.8% total protein by weight, or
ii) comprising less than about 13.8% total protein by weight and at least about 75% total protein by weight relative to total solids non-fat,
wherein the milk protein concentrate after storage for at least about three months at a temperature of about 20° C. has no apparent gelation,
c) at least one source of lipid, and
d) at least one source of carbohydrate,
wherein the liquid nutritional composition comprises
a) at least about 5% total protein by weight,
e) from about 0.1% to about 30% by weight fat,
f) from about 0.1% to about 45% carbohydrate, and
g) from about 50 to about 300 kcal per 100 mL of the composition.

In various embodiments, the liquid nutritional composition may comprise at least about 5%, 6%, 8%, 10%, 12%, 15%, or at least about 16% total protein by weight.

In a further aspect, the invention provides a method for preparing a yoghurt, the method comprising
a) providing a heat-treated, liquid milk protein concentrate that has been produced directly from fresh liquid milk, the milk protein concentrate comprising
i) at least about 13.8% total protein by weight, or
ii) comprising less than about 13.8% total protein by weight and at least about 50% total protein by weight relative to total solids non-fat,
wherein the milk protein concentrate after storage for at least about one, two or three months at a temperature of about 20° C.
i) exhibits essentially no observable gelation or aggregation,
ii) comprises less than about 5% by weight sediment,
iii) has a whiteness index value of at least about 70,
iv) has a viscosity of less than about 950 mPa·s when measured at a temperature of 20° C. and a shear rate of 100 s$^1$, or
v) a combination of any two or more of, or all of, i) to iv), and
b) mixing the milk protein concentrate with
i) at least one additional ingredient selected from the group comprising one or more milk powders, liquid milk and lactose powder, and
ii) a yoghurt starter culture,
to produce a yoghurt mix, and
c) allowing the yoghurt mix to ferment to prepare the yoghurt.

In a further aspect the invention provides a yoghurt comprising a heat-treated, liquid milk protein concentrate that has been produced directly from fresh liquid milk, the milk protein concentrate comprising
i) at least about 13.8% total protein by weight, or
ii) comprising less than about 13.8% total protein by weight and at least about 50% total protein by weight relative to total solids non-fat,
wherein the milk protein concentrate after storage for at least about one, two or three months at a temperature of about 20° C.
iii) exhibits essentially no observable gelation or aggregation,
iv) comprises less than about 5% by weight sediment,
v) has a whiteness index value of at least about 70,
vi) has a viscosity of less than about 950 mPa·s when measured at a temperature of 20° C. and a shear rate of 100 s$^{-1}$, or
vii) a combination of any two or more of, or all of, i) to iv), and wherein the yoghurt comprises at least about 3% by weight total protein.

In various embodiments the yoghurt may comprise at least about 3.5, 4, 4.5, 5, 5.5, 6, 6.5, 7, 7.5 or at least about 8% by weight total protein.

In a further aspect the invention provides a method for preparing a dairy beverage, the method comprising
a) providing a heat-treated, liquid milk protein concentrate that has been produced directly from fresh liquid milk, the milk protein concentrate comprising
i) at least about 13.8% total protein by weight, or
ii) comprising less than about 13.8% total protein by weight and at least about 50% total protein by weight relative to total solids non-fat,
wherein the milk protein concentrate after storage for at least about one, two or three months a temperature of about 20° C.
i) exhibits essentially no observable gelation or aggregation,
ii) comprises less than about 5% by weight sediment,
iii) has a whiteness index value of at least about 70,
iv) has a viscosity of less than about 950 mPa·s when measured at a temperature of 20° C. and a shear rate of 100 s-1, or
v) a combination of any two or more of, or all of, i) to iv), and
b) mixing the milk protein concentrate with liquid milk or a milk powder, or a combination thereof to produce the dairy beverage.

In a further aspect the invention provides a method for preparing a sports beverage, the method comprising
a) providing a heat-treated, liquid milk protein concentrate that has been produced directly from fresh liquid milk, the milk protein concentrate comprising
i) at least about 13.8% total protein by weight, or
ii) comprising less than about 13.8% total protein by weight and at least about 50% total protein by weight relative to total solids non-fat, wherein the milk protein concentrate after storage for at least about one, two or three months at a temperature of about 20° C.
  i) exhibits essentially no observable gelation or aggregation,
  ii) comprises less than about 5% by weight sediment,
  iii) has a whiteness index value of at least about 70,
  iv) has a viscosity of less than about 950 mPa·s when measured at a temperature of 20° C. and a shear rate of 100 s$^{-1}$, or
  v) a combination of any two or more of, or all of, i) to iv), and
b) mixing the milk protein concentrate with one or more additional ingredients selected from the group comprising one or more flavour agents, a sweetener, one or more colouring agents, one or more stabilisers, an acidity regulator, one or more vitamins, one or more minerals, and one or more enzymes to produce the sports beverage.

In various embodiments the milk protein concentrate comprises at least about 55, 60, 65, 70, or 75% total protein by weight relative to total solids non-fat.

In one embodiment the milk protein concentrate after storage for at least about three months at a temperature of about 20° C. has no apparent gelation.

In various embodiments, the milk protein concentrate may be, or may comprise, a milk protein concentrate produced by a method described herein or a milk protein concentrate described herein.

In various embodiments, the method for preparing a stable, heat-treated liquid milk protein concentrate may comprise:
  a) pasteurising fresh whole milk,
  b) optionally separating the pasteurized whole milk to produce skim milk and cream,
  c) optionally standardising either the pasteurised whole milk or skim milk with cream,
  d) fractionating either the whole milk or skim milk by either ultrafiltration and/or microfiltration to produce a concentrated milk protein fraction or retentate,
  e) optionally adding water to the whole milk or skim milk during either ultrafiltration and/or microfiltration to achieve diafiltration and produce a concentrated, diafiltered milk protein retentate,
  f) optionally treating the milk protein retentate by cation exchange,
  g) optionally subjecting the concentrated milk protein retentate to evaporation to produce a more concentrated milk protein retentate,
  h) optionally standardising the prepared, concentrated milk protein retentate by the addition of cream,
  i) heating the concentrated milk protein retentate to temperatures achieving a F0 value of at least 3.0, and
  j) aseptically packing the stable, heat-treated liquid milk protein concentrate.

Any of the embodiments or preferences described herein may relate to any of the aspects herein alone or in combination with any one or more embodiments or preferences described herein, unless stated or indicated otherwise.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

It is intended that reference to a range of numbers disclosed herein (for example, 1 to 10) also incorporates reference to all rational numbers within that range (for example, 1, 1.1, 2, 3, 3.9, 4, 5, 6, 6.5, 7, 8, 9, and 10) and also any range of rational numbers within that range (for example, 2 to 8, 1.5 to 5.5, and 3.1 to 4.7) and, therefore, all sub-ranges of all ranges expressly disclosed herein are hereby expressly disclosed. These are only examples of what is specifically intended and all possible combinations of numerical values between the lowest value and the highest value enumerated are to be considered to be expressly stated in this application in a similar manner.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

BRIEF DESCRIPTION OF THE DRAWINGS

The invention will now be described by way of example only and with reference to the drawings in which.

DETAILED DESCRIPTION OF THE INVENTION

Figure 1:
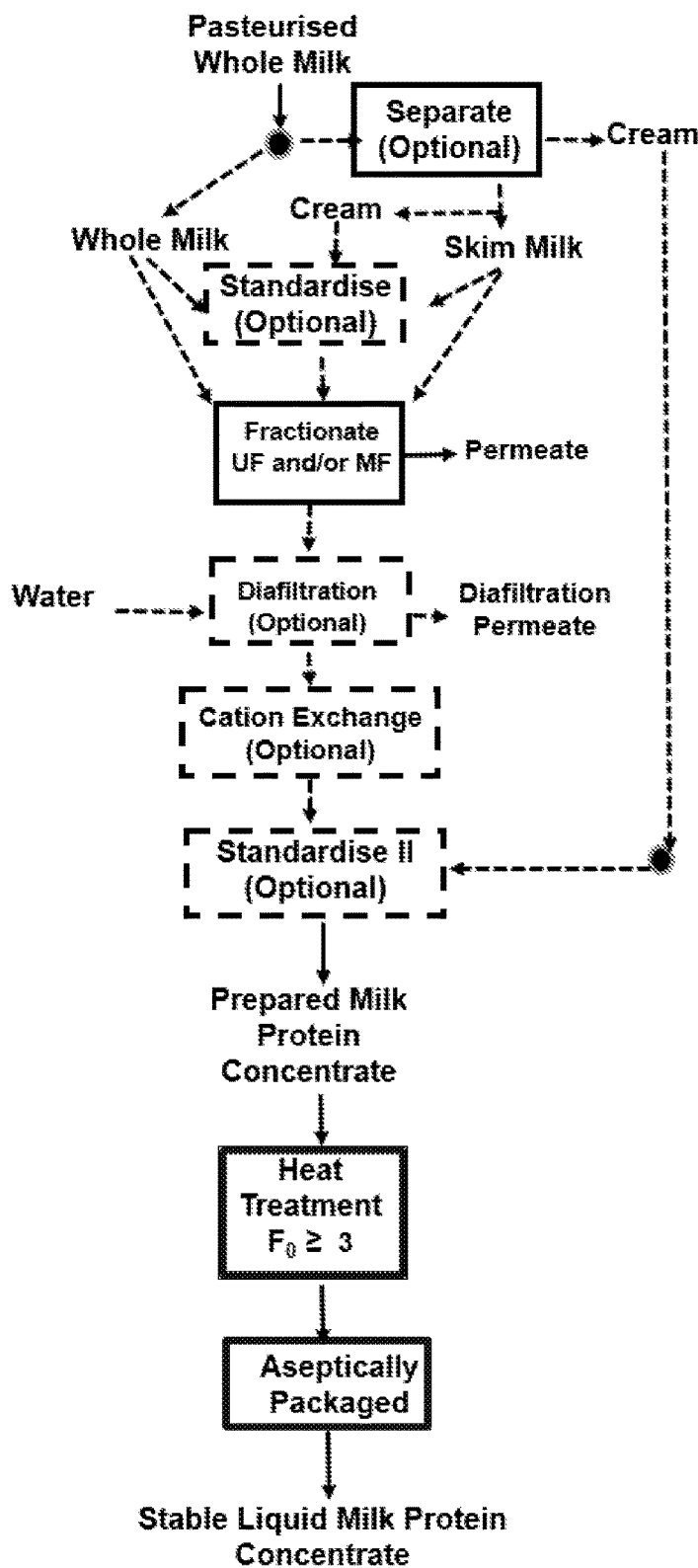
FIGS. 1 and 2 are flow charts showing exemplary methods of manufacturing the liquid milk protein concentrates described herein.

The present invention relates to a method of preparing a protein-containing food product using a heat-treated liquid milk protein concentrate produced directly from fresh milk, and use of a heat-treated liquid milk protein concentrate produced directly from fresh milk in the preparation of a protein-containing food product. The present invention also relates to the liquid MPC produced from heat-treated milk.

Food products prepared from the liquid MPCs described herein generally have improved flavour and require less time for hydrating liquid MPC versus powdered MPC. There may be less undissolved powder particles. Additionally, when hydrating liquid MPC versus powdered MPC, minimal foaming occurs therefore the use of antifoam may not be required for liquid MPC.

1. Definitions

The term "comprising" as used in this specification means "consisting at least in part of". When interpreting statements in this specification which include that term, the features, prefaced by that term in each statement, all need to be present but other features can also be present. Related terms such as "comprise" and "comprised" are to be interpreted in the same manner.

The term "liquid nutritional composition" refers to an aqueous composition preferably consumed or administered by mouth. Alternatively, liquid nutritional compositions can be administered by other means, such as by tube feeding to the stomach of a patient, including naso-gastric feeding and gastric feeding. Liquid nutritional compositions include "medical foods", "enteral nutrition", "foods for special medical purposes", liquid meal replacers, and supplements. The liquid nutritional compositions of the present invention provide significant amounts of protein, carbohydrate and usually fat; as well as optional vitamins and minerals. In exemplary embodiments the liquid nutritional compositions provide balanced meals.

The term "milk protein concentrate" (or MPC) as used herein refers to a milk protein product in which greater than 42%, and preferably greater than 75%, of the dry matter is milk protein. Typically, MPCs maintain a ratio of casein-to-whey proteins that is approximately that of milk. Alternatively, MPCs can be prepared with a higher ratio of casein to whey proteins than typically occurs in milk. Milk protein concentrates can also include modified or functional MPCs, such as a calcium-depleted MPC or other counterion-modified MPCs. Such concentrates are known in the art.

A "calcium-depleted MPC" may be formed by depleting the calcium content of an unmodified MPC to be 20 to 85% of the calcium content of the unmodified MPC by subjecting an aqueous solution of the unmodified MPC to cation exchange using a food approved cation exchanger containing monovalent cations and recovering a modified MPC. Calcium depleted MPCs may be produced by the methods described in published international PCT application WO 2001/041578, incorporated herein by reference in its entirety.

The term "shelf-stable" as used herein refers to aseptically packaged liquid compositions that remain in a liquid state after prolonged storage at a temperature of about 20° C., 22° C., or about 25° C. for at least about 2 months, three months, 6 months, 12 months, or at least about 24 months. The liquid compositions exhibit essentially no observable sedimentation, gelation or aggregation, and negligible bacterial growth after storage.

The term "milk protein" as used herein refers to the value calculated from the percentage nitrogen in the sample using the following equation:

% total milk protein=% nitrogen×6.38 see Cunniff, P. ed. 1997. § 33.2.11 AOAC Official Method 991.20 Nitrogen (Total) in Milk. Official Methods of Analysis of AOAC International. 16th ed., 3rd Revision. Vol. II. AOAC International. Gaithersburg, MD (Chapt. 33.0 pg. 11).

As used herein "apparent gelation" refers to a voluminous material that can peel away from the pack when pouring, which is due to the irreversible change of state of a milk product in which the contents of the package lose fluidity and forms a weak but irreversible gel.

The terms "fresh milk" and "fresh liquid milk" as used herein refer to raw milk obtained directly from a cow at milking or raw milk that has undergone minimal processing following milking. Contemplated by these terms is material prepared by pasteurisation and/or standardisation of raw milk, for example, milk that has undergone pasteurisation at a temperature of from about 70° C. to 74° C. for from about 8 to about 60 seconds. Excluded from the scope of these terms is material which has been prepared by reconstituting a milk and/or MPC powder, or a combination of powders in water (or any other liquid) to produce a liquid milk.

The term "directly" as used herein with reference to preparation of MPCs described herein is intended to mean that the MPC is prepared from fresh, liquid milk with minimal intervening, additional processing. In particular, the term "directly" should be understood to mean that the liquid MPC is not prepared by reconstitution of powdered MPC.

2. Source Material

The heat-treated liquid milk protein concentrate may be produced directly from fresh liquid milk. The fresh liquid milk is mammalian milk.

In some embodiments, the fresh liquid milk may be any mammalian milk including but not limited to bovine, sheep, goat, pig, mouse, water buffalo, camel, yak, horse, donkey, llama or human, with bovine milk being a preferred source.

In various embodiments, the fresh liquid milk is not reconstituted. In various embodiments, the fresh liquid milk may be whole milk or skim milk.

In various embodiments, the milk protein concentrate may be produced from a composition comprising casein and whey protein. In various embodiments, the composition comprising casein and whey protein may be fresh milk. In various embodiments, the composition comprising casein and whey protein may be whole milk or skim milk.

3. Ultrafiltration and Microfiltration

To produce a heat-treated liquid milk protein concentrate directly from fresh liquid milk, the fresh liquid milk may first be filtered. In one embodiment, the milk protein concentrate may be prepared by a method comprising subjecting fresh liquid milk to ultrafiltration and/or microfiltration to produce a retentate.

Filters are porous barriers that physically block the passage of particles in feed streams that are larger than the pores, while allowing the passage of smaller particles. Selected filters with pores ranging between 0.001 to 0.1 µm act as ultrafiltration (UF) systems. This pore size range allows respective UF systems to block the passage of molecules and compounds with molecular weights ranging between 1,000 to 500,000 Da. The smallest particle that the pores of a specific UF system can retain is usually called the molecular weight cutoff. The UF systems commonly used in dairy applications to produce MPCs typically have molecular weight cutoffs between 5,000 to 10,000 Da. The cutoffs of these UF systems retain all of the milk fat (present as milk fat globules), milk proteins, and residual amounts of the smaller milk components in a fraction called the retentate. Water, lactose, nonprotein nitrogen, and dissolved minerals freely pass through the pores of such UF systems to produce a fraction called the permeate. Permeate does not contain milk fat or milk protein. The UF processing of milk or skim milk fractionates the solid milk components to produce retentates that become MPC with higher milk protein content.

Suitable membranes for ultrafiltration include polyethersulfone membranes. Other ultrafiltration membranes known in the art may also be suitable as will be apparent to those skilled in the art.

In various embodiments ultrafiltration may be conducted using a membrane having a molecular weight cut-off of at least about 1,000, 1,500, 2,000, 3,000, 3,500, 4,000, 5,000, 6,000, 7,000, 8,000, 9,000, 10,000, 12,500, 15,000, 17,500, 20,000, 25,000, 30,000, 40,000, 50,000, 60,000, 70,000, 80,000, 90,000, 100,000, 150,000, 200,000, 250,000, 300,000, 350,000, 400,000, 450,000, or 500,000 Da, and useful ranges may be selected from between any of these values, for example, (from about 1,000 to about 30,000, about 3,000 to about 30,000, about 5,000 to about 30,000, about 1,000 to about 25,000, about 2,000 to about 25,000, about 3,000 to about 25,000, about 5,000 to about 25,000, about 1,000 to about 20,000, about 2,000 to about 20,000, about 3,000 to about 20,000, about 5,000 to about 20,000, about 10,000 to about 20,000, about 2,000 to about 15,000, about 3,000 to about 15,000, about 5,000 to about 15,000, about 2,000 to about 10,000, about 3,000 to about 10,000, about 5,000 to about 10,000, about 1,000 to 500,000, about 10,000 to about 500,000, about 1,000 to 400,000, about 10,000 to about 400,000, about 1,000 to 300,000, about 10,000 to about 300,000, about 1,000 to 200,000, about 10,000 to about 200,000, about 1,000 to 100,000, about 10,000 to about 100,000, about 1,000 to 50,000, about 10,000 to about 50,000).

In various embodiments ultrafiltration may be conducted using a membrane having a pore size of about 0.001 to about 0.1 μm.

The pore size range of microfiltration (MF) systems approximately ranges between 0.05 to about 0.2 μm. This pore size allows the passage of small proteins, so the resulting retentate contains all of the milk fat, most of the casein (which should be present as casein micelles), and some residual components. The permeate contains water, the milk proteins α-lactalbumin and β-lactoglobulin, lactose, and soluble minerals. Although MF concentrates milk proteins, the MPCs produced from MF retentate contain lesser amounts of α-lactalbumin and β-lactoglobulin as a percentage of total protein than what is present in the original milk.

In various embodiments the milk is subjected to microfiltration and/or ultrafiltration at a temperature less than about 80° C., preferably from about 5 to about 79° C., more preferably from about 10 to about 50° C.

In various embodiments, the retentate may comprise at least about 15% by weight total solids non-fat.

4. Diafiltration

The ultrafiltration or microfiltration retentate may then undergo diafiltration. In various embodiments, the retentate may be subjected to diafiltration to produce a diafiltered retentate before heat treatment. Diafiltration is the addition of water to the ultrafiltration or microfiltration retentate so that additional membrane-permeable species may be removed without significantly increasing the concentration of membrane-retained species.

5. Evaporation

Evaporation may be used in combination with, preferably following, diafiltration to further concentrate the retentate. In various embodiments, the diafiltered retentate may be subjected to evaporation to produce a concentrated retentate before heat treatment. Suitable evaporation processes are well known in the art and may include falling-film evaporation, plate evaporation, centrifugal evaporation or thin-film evaporation. Preferably, the extent of concentration by evaporation is such that the lactose concentration in the concentrated retentate does not exceed that of the original skim milk.

6. Standardisation

Standardisation of the milk or retentate, diafiltered retentate or concentrated retentate may be employed to standardize the fat content of the MPC. In various embodiments the method comprises adding cream to the skim milk before ultrafiltration and/or microfiltration. In other embodiments the method comprises adding cream to the milk protein retentate, diafiltered retentate and/or concentrated retentate before heat treatment.

7. Heat Treatment

Following filtration, the retentate may undergo heat treatment. In various embodiments, the method may comprise directly subjecting the retentate, diafiltered retentate or concentrated retentate, to the heat treatment.

As will be appreciated by those skilled in the art, the lethal effect of high temperatures on microorganisms is dependent on both temperature and holding time, and the reduction in time required to kill the same number of microorganisms as temperature is increased is well known. The time taken to reduce initial microbial numbers, at a specified temperature, by a required amount, is commonly referred to as a "F value". As described in Mullan, W. M. A. (2007) (Mullan, W. M. A., Calculator for determining the F value of a thermal process. [On-line]. Available from: www.dairy-science.info/calculators-models/134-f-value-thermal-process.html) and references therein, the F value of a thermal process can be calculated by plotting lethal rates against process time, where lethal rate can be calculated using the following equation (Stobo, 1973):

$$\text{Lethal rate} = 10^{(T-T_r)/z}$$

where T is the temperature at which the lethal rate is calculated, Tr is the reference temperature at which the equivalent lethal effect is compared, and z is the reciprocal of the slope of the thermal death curve for the target microorganism or spore (all values in degrees Celsius).

The F value is calculated as the sum of the lethal rate and the residence time, t, at each stage of the heat treatment process. In particular, $F_0$ is the equivalent time required at a reference temperature of 121.1° C. using a z value of 10° C.

$$F_0 = \int 10^{(T-121.1)/10} \cdot dt$$

As discussed herein, the milk protein concentrates used in the method of the present invention are typically subjected to a heat treatment having an $F_0$ value of at least 3.0, preferably at least 6.0, more preferably at least 9.0, whilst exhibiting useful heat stability, such as not forming a gel.

Various heat treatments of the retentate or concentrated retentate may be used. Ultra-high temperature (UHT) treatment is exemplary. Typical UHT conditions are 135 to 155° C. for 0.1 to 20 seconds, but longer durations are possible, for example 10 seconds, 15 seconds, 20 seconds, or more. Another process used to ensure sterility is retort heat treatment—often 120-130° C. for 10 to 20 minutes. Examples of such heat treatments can have $F_0$ values well in excess of the minimum threshold. Other combinations of equivalent heat treatment are known and are applicable to the present invention given appropriate adherence to the requirements of microbial stability. An example of such a process is extended shelf life treatment for refrigerated storage where thermal treatments in excess of the original pasteurization but with $F_0$ values of less than 3 are applied, for example 135° C. for 0.5 s or 127° C. for 2 s. Other known art non-thermal processes can be used in combination with heat treatment to inhibit microbiological activity in the milk protein concentrate, for example microfiltration.

F values can thus be used to describe the thermal input into a particular process. $F_0$ is a measure of the amount of lethal heat which results from a specified thermal process (usually measured at the point of lowest lethality in the container). The number is the lethal effect equivalent to the number of minutes at 121.1° C. when assuming instantaneous heating and cooling and a z value of 10° C. As discussed herein, the milk protein concentrates used in the present invention are typically subjected to a heat treatment having an $F_0$ value of at least 3.0, whilst exhibiting useful heat stability, such as not forming a gel.

In various embodiments, the milk protein concentrate may be subjected to a heat treatment having an $F_0$ value of at least 3.0, or at least 6.0, or at least 9.0.

In various embodiments, the milk protein concentrate may be subjected to a heat treatment having an $F_0$ value of at least 3.0, or at least 6.0, or at least 9.0 after ultrafiltration or microfiltration, and/or diafiltration.

In various embodiments, the retentate may be subjected to a heat treatment having an $F_0$ value of at least 3.0, or at least 6.0, or at least 9.0 to prepare the milk protein concentrate.

Heat treatments are typically performed in a continuous manner through a series of heat exchangers, and in some cases also by direct steam injection and flash cooling, followed by aseptic packing. Heat treatments can also be applied batchwise to the product in sealed containers in which case longer holding times at lower temperatures than those used in continuous plants must be used to meet the minimum $F_0$ requirements throughout the containers.

Referring to FIG. 1, whole milk or skim milk may be subjected to fractionation by ultrafiltration or microfiltration as discussed herein, and the retentate collected. Cream may be optionally separated from the whole milk and optionally used to standardise the solids content of the whole milk, skim milk, or ultrafiltration or microfiltration retentate. Optional diafiltration may be used to increase the solids content of the ultrafiltration or microfiltration retentate. Optional cation exchange chromatography may be used to modify the cation content of the ultrafiltration or microfiltration retentate. Following filtration, and optional cation exchange and/or standardisation, the collected retentate is a milk protein concentrate. The milk protein concentrate is subjected to a heat treatment having an $F_0$ of at least 3 and aseptically packaged to produce a stable liquid milk protein concentrate.

Figure 2:
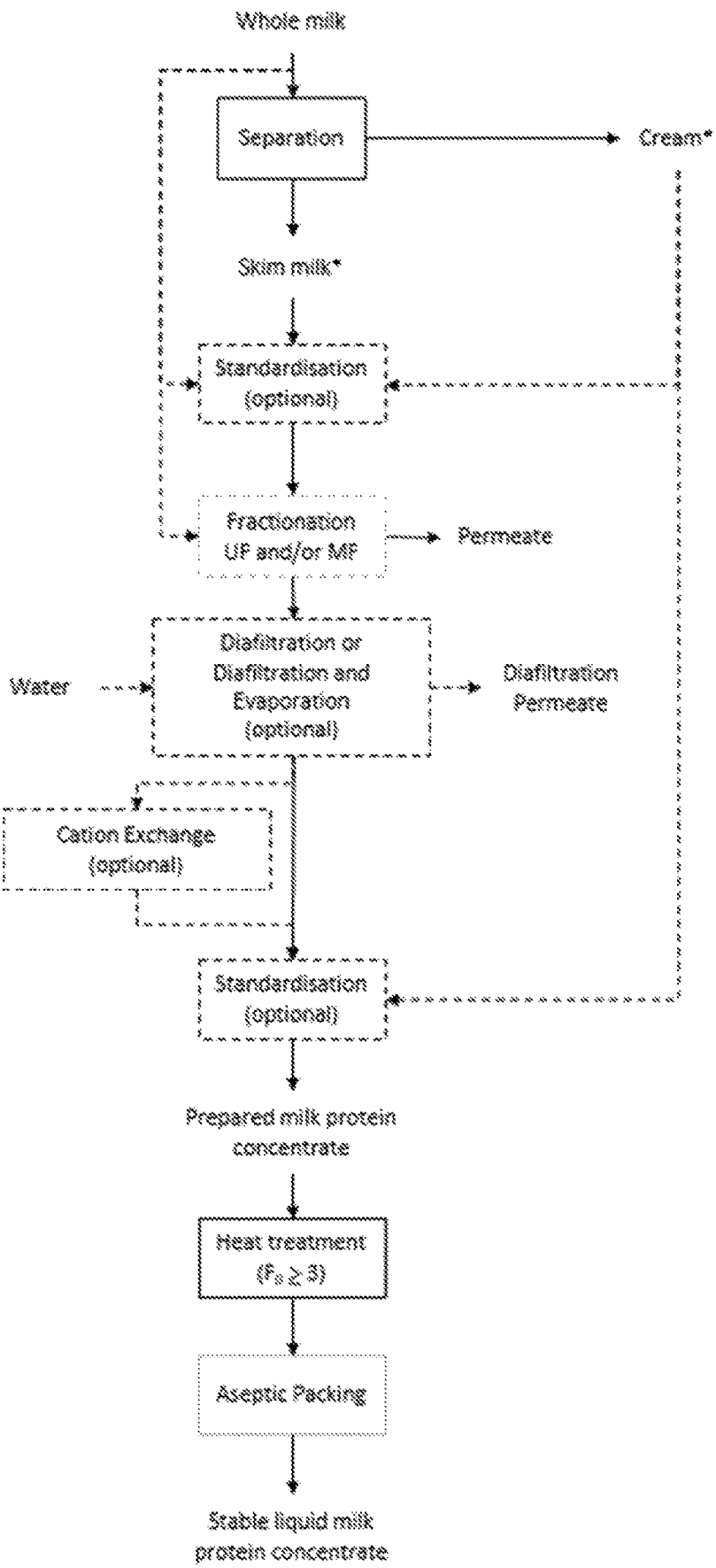

Referring to FIG. 2, optional evaporation may be used, preferably in combination with diafiltration, to increase the protein content of the ultrafiltration or microfiltration retentate.

8. Heat-Treated Liquid Milk Protein Concentrate

In various embodiments, described herein is a heat-treated, shelf stable liquid milk protein concentrate produced by a method as described herein.

In various embodiments, the milk protein concentrate may comprise
  i) at least about 6% total protein by weight, and
  ii) at least about 50% total protein by weight relative to total solids non-fat.

In various embodiments, the milk protein concentrate may comprise at least about 6%, 7%, 8%, 9%, 10%, 11%, 12%, 13%, 13.8%, 14%, 14.5%, 15% by weight, 15.5% by weight, or 16% total protein by weight.

In various embodiments, the milk protein concentrate may comprise up to about 25%, 24%, 23%, 22%, 21%, 20%, 19%, 18%, 16% total protein by weight.

In various embodiments the milk protein concentrate may comprise at least about 6, 7, 7.5, 8, 8.5, 9, 9.5, 10, 10.1, 10.2, 10.3, 10.4, 10.5, 10.6, 10.7, 10.8, 10.9, 11, 11.1, 11.2, 11.3, 11.4, 11.5, 11.6, 11.7, 11.8, 11.9, 12, 12.1, 12.2, 12.3, 12.4, 12.5, 12.6, 12.7, 12.8, 12.9, 13, 13.1, 13.2, 13.3, 13.4, 13.5, 13.6, 13.7, 13.8, 13.9, 14, 14.1, 14.2, 14.3, 14.4, 14.5, 14.6, 14.7, 14.8, 14.9, 15, 15.1, 15.2, 15.3, 15.4, 15.5, 15.6, 15.7, 15.8, 15.9, 16, 16.25, 16.5, 16.75, 17, 17.5, 18, 18.5, 19, 19.5, 20, 20.5, 21, 22, 23, 24 or about 25% total protein by weight, and any range may be selected from between any of these values.

In various embodiments, the milk protein concentrate may comprise from about 6% to about 25% total protein by weight, and useful ranges may be selected from between any of these values (for example, from about 6% to about 25%, or about 6% to about 22%, 6% to about 20%, 6% to about 18%, or about 6% to about 15%, or about 6% to about 12%, or about 6% to about 10%, or about 8% to about 25%, or about 8% to about 22%, 8% to about 20%, 8% to about 18%, or about 8% to about 15%, or about 8% to about 12%, or about 8% to about 10%, or about 9% to about 25%, or about 9% to about 22%, 9% to about 20%, 9% to about 18%, or about 9% to about 15%, or about 9% to about 12%, or about 9% to about 10%, or about 10% to about 25%, or about 10% to about 22%, 10% to about 20%, 10% to about 18%, or about 10% to about 15%, or about 10% to about 12%, or about 12% to about 25%, or about 12% to about 22%, 12% to about 20%, 12% to about 18%, or about 12% to about 15%, about 14% to about 25%, or about 14% to about 22%, 14% to about 20%, 14% to about 18%).

In various embodiments, the milk protein concentrate may comprise at least about 50%, 55%, 60%, 65%, 70%, 75%, 80%, or 85% total protein by weight relative to total solids non-fat.

In various embodiments, the milk protein concentrate may comprise
  i) at least about 6%, 7%, 8%, 9%, 10%, 11%, 12%, or 13%, 13.8%, 14%, or 15% total protein by weight, and
  ii) at least about 50%, 55%, 60%, 65%, 70%, 75%, or 80% total protein by weight relative to total solids non-fat.

In various embodiments, the milk protein concentrate may comprise at least about 13.8% total protein by weight, or comprises less than about 13.8% total protein by weight and at least about 75% total protein by weight relative to total solids non-fat.

In various embodiments, the milk protein concentrate may comprise less than about 13.8%, or about 13.5%, or about 13% total protein by weight and at least about 75%, or about 80%, or about 85% total protein by weight relative to total solids non-fat.

The protein content may be measured by the Kjedahl method with a conversion factor of 6.38. Other methods of measuring protein content will be apparent to a skilled worker.

In various embodiments, the method may comprise holding the milk protein concentrate at a temperature of at least about 10° C. for at least about 3 days before the mixing step. In various embodiments, the method may comprise holding the milk protein concentrate at a temperature of at least about 10° C. for at least about 3 days, or at least about 4 days, or at least about 5 days, or at least about 7 days, or at least about 8 days, or at least about 10 days before the mixing step. In various embodiments, the method may comprise holding the milk protein concentrate at a temperature of at least about 20° C. for at least about 3 days, or at least about 4 days, or at least about 5 days, or at least about 7 days, or at least about 8 days, or at least about 10 days before the mixing step.

Milk protein concentrate produced by the method described herein is stable after storage for at least about three months at a temperature of about 20° C. Stability can be established by various means and measurements including viscosity, gelation or aggregation, sedimentation, or whiteness index. Other methods of determining stability would be known to a skilled worker. It should be understood that the milk protein concentrate need not be stored for three months within the methods of the invention, but that the milk protein concentrate is suitable for such storage.

In various embodiments, the milk protein concentrate after storage for at least about three months at a temperature of about 20° C. may have no apparent gelation.

In various embodiments, the milk protein concentrate after storage for at least about three months at a temperature of about 20° C. may have a viscosity of less than about 100 mPa·s when measured at a temperature of 20° C. and a shear rate of 39.8 s$^{-1}$.

I The viscosity of the sample may be measured by methods known to a skilled worker. One method involves using an MCR302 rheometer (Anton Paar) with a cup and bob geometry (CC27-SS and CC27, diameters 28.992 and 26.663 mm). The sample is subjected to a pre-shear of 300 s$^{-1}$ for 1 minute followed by a rest period of 1 minute prior to measurement. The sample is subjected to a shear rate sweep from 0.001-398 s$^{-1}$ with the viscosity taken at 39.8 s$^{-1}$ and/or 100 s$^{-1}$. The sample is measured at 20° C.

In various embodiments, the milk protein concentrate after storage for at least about one, two or three months, or at least about 4 months, or at least about 5 months, or at least about 6 months, or at least about 8 months, or at least about 12 months, or at least about 15 months, or at least about 18 months, or at least about 24 months at a temperature of about 20° C. may have no apparent gelation.

In various embodiments, the milk protein concentrate after storage for at least about one month, two months, three months, or at least about 4 months, or at least about 5 months, or at least about 6 months at a temperature of about 20° C. may have a viscosity of less than about 100 mPa·s when measured at a temperature of 20° C. and a shear rate of 39.8 s$^{-1}$.

In various embodiments, the milk protein concentrate after storage for at least about one month, two months or at least about three months at a temperature of about 20° C. may have a viscosity of less than about 100 mPa·s, 90 mPa·s, 80 mPa·s, or 70 mPa·s when measured at a temperature of 20° C. and a shear rate of 39.8 s$^{-1}$.

In various embodiments, the milk protein concentrate after storage for at least about one month, two months, three months, or at least about 4 months, or at least about 5 months, or at least about 6 months at a temperature of about 20° C. may have a viscosity of less than about 2000, 1800, 1750, 1600, 1500, 1400, 1250, 1200, 1100, 1000, 975, 950, 925, 900, 875, 850, 825, 800, 775, 750, 725, 700, 675, 650, 625, 600, 575, 550, 525, 500, 475, 450, 425, 400, 375, 350, 325, 300, 275, 250, 225, 200, 175, 150, 125, or 100 mPa·s when measured at a temperature of 20° C. and a shear rate of 39.8 s$^{-1}$.

In various embodiments, the milk protein concentrate after storage for at least about one month, two months, three months, or at least about 4 months, or at least about 5 months, or at least about 6 months at a temperature of about 20° C. may have a viscosity of less than about 2000, 1800, 1750, 1600, 1500, 1400, 1250, 1200, 1100, 1000, 975, 950, 925, 900, 875, 850, 825, 800, 775, 750, 725, 700, 675, 650, 625, 600, 575, 550, 525, 500, 475, 450, 425, 400, 375, 350, 325, 300, 275, 250, 225, 200, 175, 150, 125, or 100 mPa·s when measured at a temperature of 20° C. and a shear rate of 100 s$^{-1}$.

In various embodiments, the milk protein concentrate after storage for at least about three months at a temperature of about 4° C. may
i) exhibit essentially no observable gelation or aggregation,
i) comprise less than about 5% by weight sediment,
ii) have a whiteness index value of at least about 70, or
iii) any combination of any two or more, or all of (i) to (iii).

In various embodiments, the milk protein concentrate after storage for at least about three months at a temperature of about 20° C. may
i) exhibit essentially no observable gelation or aggregation,
ii) comprise less than about 5% by weight sediment,
iii) have a whiteness index value of at least about 70, or
iv) any combination of any two or more, or all of (i) to (iii).

In various embodiments, the milk protein concentrate after storage for at least about three months at a temperature of about 30° C. may
i) exhibit essentially no observable gelation or aggregation,
ii) comprise less than about 5% by weight sediment,
iii) have a whiteness index value of at least about 70, or
iv) any combination of any two or more, or all of (i) to (iii).

Gelation or aggregation may be assessed visually for gelation and aggregation when removed from storage and the storage container may be assessed for sediment after pouring the sample out.

Sediment levels may be determined by diluting samples to 10% (w/w) protein with water and centrifuging at 1709×g for 30 minutes at 20° C. in a pre-weighed centrifuge tube using a Heraeus Multifuge 1S-R (Thermo Scientific), with the swinging bucket rotor TTH 400. The supernatant is removed after configuration and the weight of the sediment remaining is calculated on a wet basis (w/w):

(wet sediment−tube weight)/(initial sample weight in tube)×100%

Whiteness index value may be determined by measuring the colour of the samples using a ColorFlex EZ (HunterLab) with the Universal programme. A standard white and black tile is used for calibration. The Whiteness index is reported as this gives an indication of any darkening of the samples, and is based on the L*,a*,b* colour space:

$$WI=100-\sqrt{((100-L^*)^2 a^{*2} b^{*2})}$$

In various embodiments, the milk protein concentrate after storage for at least about three months at a temperature of about 20° C., or about 30° C., or about 4° C. may have a whiteness index value of at least 70, for example, at least 75, or at least 80.

In various embodiments, the milk protein concentrate after storage for at least about three months at a temperature of about 20° C. has a damping factor characteristic of a liquid when measured at 20° C. or greater.

In various embodiments, the milk protein concentrate after storage for at least about three months at a temperature of about 20° C. has a damping factor of greater than 1 determined by small strain rheological testing when performed at 20° C. or greater.

Damping factor may be determined using the methods described in Lam et al. (Lam, E., Otter, D., Huppertz, T., Zhou, P. & Hemar, Y. (2019). Effect of transglutaminase and acidification temperature on the gelation of reconstituted milk. International Dairy Journal, 92 (59-68)) whereby G' and G" values were recorded as a function of time, at a constant frequency of 1 Hz and a constant applied strain of 0.5% at a temperature of at least 20° C., using an MCR301 rheometer (Anton Paar). A ratio of G'/G" determined at each time point determines the damping factor and can be interpreted according to Mezger (T. G. Mezger, Ulrich Zorll (Ed.), The rheology handbook: for users of rotational and oscillatory rheometers, Hannover, Germany (2002)).

In various embodiments, the milk protein concentrate is not reconstituted.

In various embodiments, the milk protein concentrate may be packed to produce a packed milk protein concentrate comprising at least about 13.8% total protein by weight, or comprising less than about 13.8% total protein by weight and at least about 75% total protein by weight relative to total solids non-fat.

In various embodiments, the milk protein concentrate does not comprise added stabilisers or mouthfeel enhancers.

In various embodiments, the milk protein concentrate does not comprise added non-dairy ingredients. For example, in various embodiments the milk protein concentrate does not comprise added stabilisers, mouthfeel enhancers, emulsifiers, flavourings or thickeners.

In various embodiments, the milk protein concentrate may be a high-fat milk protein concentrate. High-fat milk protein concentrates may be produced by blending the milk protein concentrate with cream or vegetable oil, or by ultrafiltration or microfiltration of whole milk. A high-fat milk protein concentrate may comprise a product with a protein:fat ratio of less than 50:1.

In various embodiments, the invention provides a method of preparing a liquid milk protein concentrate, the method comprising
a) providing a composition comprising casein and whey protein,
b) subjecting the composition to microfiltration or ultrafiltration to produce a retentate, and
c) subjecting the retentate to a heat treatment having an $F_0$ value of at least 3.0 to prepare a milk protein concentrate comprising at least about 13.8% total protein by weight, or comprising less than about 13.8% total protein by weight and at least about 75% total protein by weight relative to total solids non-fat,
wherein the milk protein concentrate after storage for at least about three months at a temperature of about 20° C. has no apparent gelation.

9. Protein Containing Food Products

In various embodiments, the invention provides a method for preparing a protein-containing food product, the method comprising
a) providing a heat-treated, liquid milk protein concentrate that has been produced directly from fresh, liquid milk, the milk protein concentrate comprising
i) at least about 6% total protein by weight, and
ii) at least about 50% total protein by weight relative to total solids non-fat,
wherein the milk protein concentrate after storage for at least about one, two or three months at a temperature of about 20° C.
i) exhibits essentially no observable gelation or aggregation,
ii) comprises less than about 5% by weight sediment,
iii) has a whiteness index value of at least about 70,
iv) has a viscosity of less than about 950 mPa·s when measured at a temperature of 20° C. and a shear rate of 100 s$^{-1}$, or
v) a combination of any two or more of, or all of, i) to iv), and
b) mixing the milk protein concentrate with one or more additional ingredients to produce the protein-containing food product.

In various embodiments, the invention provides use of a heat-treated, liquid milk protein concentrate that has been produced directly from fresh liquid milk in the preparation of a protein-containing food product, the milk protein concentrate comprising
a) at least about 6% total protein by weight, and
b) at least about 50% total protein by weight relative to total solids non-fat,
wherein the milk protein concentrate after storage for at least about one, two or three months at a temperature of about 20° C.
i) exhibits essentially no observable gelation or aggregation,
ii) comprises less than about 5% by weight sediment,
iii) has a whiteness index value of at least about 70,
iv) has a viscosity of less than about 950 mPa·s when measured at a temperature of 20° C. and a shear rate of 100 s$^{-1}$, or
v) a combination of any two or more of, or all of, i) to iv).

The milk protein concentrate may be mixed with additional ingredients to produce a protein-containing food product. In various embodiments, the method may comprise mixing the milk protein concentrate with one or more additional ingredients to produce a protein-containing food product. The protein-containing food product may be any edible consumer product which is able to carry protein.

In various embodiments, the protein-containing food product may comprise at least about 1%, 1.5%, 2%, or 2.5% total protein by weight. In various embodiments, the protein-containing food product may comprise from about 1% to about 25% total protein by weight, and useful ranges may be selected from between any of these values (for example, from about 1% to about 20%, or about 1% to about 16%, 1% to about 15%, 1% to about 14%, or about 1% to about 12%, or about 1% to about 10%, or about 2% to about 20%, or about 2% to about 16%, 2% to about 15%, 2% to about 14%, or about 2% to about 12%, or about 2% to about 10%, about 4% to about 20%, or about 4% to about 16%, 4% to about 15%, 4% to about 14%, or about 4% to about 12%, or about 4% to about 10%, about 5% to about 20%, or about 5% to about 16%, 5% to about 15%, 5% to about 14%, or about 5% to about 12%, or about 5% to about 10%).

In various embodiments the protein-containing food product may be a liquid nutritional composition, a beverage, ice cream, acidified/fermented milk, cheese, a pudding, a frozen dessert, coffee whitener, foam layer in a biscuit or in chocolate, a cream, and a gel.

Liquid nutritional compositions may include a medical beverage. A beverage may include a sports beverage, dairy beverage, or a yoghurt beverage. Coffee whiteners may include liquid and powdered coffee whiteners. Acidified/fermented milk food products may include yoghurt.

In various embodiments the dairy beverage may be a protein fortified milk, a flavoured milk or a low lactose milk. In various embodiments the dairy beverage comprises at least about 2, 3, 4, 5, 6, 7 or 8% total protein by weight or from about 2% to about 8%, about 3% to about 8% or from about 4% to about 8% total protein by weight. A protein fortified milk typically comprises up to about 8% by weight total protein and may have a fat and lactose content typical of natural levels in milk or optionally can be low in fat. A flavoured milk beverage typically comprises natural levels of milk protein, fat and lactose with added flavours, colours, stabilisers and sweeteners; optionally, the beverage may have reduced levels of protein or increased levels of protein, up to 8% and/or reduced levels of fat. A low lactose milk beverage comprises no lactose by the addition of lactase enzyme and typically contains natural levels of protein and fat, optionally, low fat. Dairy beverages may be processed via pasteurisation, UHT, ESL and retort sterilisation, or other methods known in the art to process dairy beverages.

A sports beverage typically comprises a high content of protein, up to about 10% total protein by weight, has a low-fat content and has added vitamins and minerals, flavours, sweeteners, stabilisers and salt. In various embodiments the sports beverage comprises at least about 2, 3, 4, 5, 6, 7, 8, 9 or 10% total protein by weight or from about 2% to about 10%, about 3% to about 10% or from about 4% to about 10% total protein by weight.

In various embodiments the protein-containing food product may be a nutritionally complete composition or a high energy liquid or powder for breakfast or other times of the day.

In various embodiments the protein-containing food product may contain nutrients that include vitamins and minerals. The recommended daily requirements of vitamins and minerals can be specified for various population subgroups. See for instance, Dietary Reference Intakes: RDA and AI for vitamins and elements, United States National Academy of Sciences, Institute of Medicine, Food and Nutrition Board (2010) tables recommended intakes for infants 0-6, 6-12 months, children 1-3, and 4-8 years, adults males (6 age classes), females (6 age classes), pregnant (3 age classes) and lactating (3 age classes). Concentrations of essential nutrients in the liquid nutritional composition can be tailored in the exemplary serve size for a particular subgroup or medical condition or application so that the nutrition and ease of delivery requirements can be met simultaneously.

In various embodiments, the pH of the protein containing food product may be adjusted using food-safe acidic or basic additives. In various embodiments, the pH of the protein containing food product may be adjusted to about pH 4 to about pH 8, for example to about pH 4 to about pH 7, or about pH 4 to about pH 6.8, or about pH 5 to about pH 7, or about pH 5 to about pH 6.8. In various embodiments, the pH of the protein containing food product may be adjusted to about pH 6.8.

pH may be measured by equilibrating samples to 25° C. and measuring using a pH probe (EC620132, Thermo Scientific) after calibrating using standards at pH 4, 7, and 10 (Pronalys, LabServ). Other methods of measuring pH will be apparent to a skilled worker.

In various embodiments the protein-containing food product may be administered to a subject to maintain or increase muscle protein synthesis, maintain or increase muscle mass, prevent or increase loss of muscle mass, maintain or increase growth, prevent or decrease muscle catabolism, prevent or treat cachexia, prevent or treat sarcopenia, increase rate of glycogen resynthesis, modulate blood sugar levels, increase insulin response to raised blood glucose concentration, increase satiety, increase satiation, increase food intake, increase calorie intake, improve glucose metabolism, increase rate of recovery following surgery, increase rate of recovery following injury, increase rate of recovery following exercise, increase sports performance, and/or provide nutrition.

In various embodiments, the protein containing food product may be prepared by a method comprising providing a heat-treated liquid milk protein concentrate produced directly from fresh liquid milk as described herein, and mixing with at least one source of lipid. In various embodiments, the protein containing food product may be prepared by a method comprising providing a heat-treated liquid milk protein concentrate produced directly from fresh liquid milk as described herein, and mixing with at least one source of carbohydrate.

In various embodiments, the protein containing food product may comprise a heat-treated liquid milk protein concentrate produced directly from fresh liquid milk as described herein and at least one source of lipid. In various embodiments, the protein containing food product may comprise a heat-treated liquid milk protein concentrate produced directly from fresh liquid milk as described herein, and at least one source of carbohydrate.

In various embodiments, the protein containing food product may be prepared by a method comprising providing a heat-treated liquid milk protein concentrate produced directly from fresh liquid milk as described herein, and mixing with at least one source of lipid and at least one source of carbohydrate.

In various embodiments, the protein containing food product may comprise a heat-treated liquid milk protein concentrate produced directly from fresh liquid milk as described herein, at least one source of lipid, and at least one source of carbohydrate.

In various embodiments, the protein containing food product may comprise at least about 0.1% fat by weight, such as about 0.1%, or about 0.5%, or about 1%, or about 3%, or about 5%, or about 10% fat by weight. In various embodiments, the protein containing food product may comprise from about 0.1% to 40% fat by weight, and useful ranges may be selected from between any of these values (for example, from about 0.1% to about 40%, or about 0.5% to about 40%, or about 1% to about 40%, or about 3% to about 40%, or about 5% to about 40%, or about 10% to about 40%, or about 15% to about 40%, or about 20% to about 40%, or about 0.1% to about 35%, or about 0.5% to about 35%, or about 1% to about 35%, or about 3% to about 35%, or about 5% to about 35%, or about 10% to about 35%, or about 15% to about 35%, or about 20% to about 35%, or about 0.1% to about 30%, or about 0.5% to about 30%, or about 1% to about 30%, or about 3% to about 30%, or about 5% to about 30%, or about 10% to about 30%, or about 15% to about 30%, or about 20% to about 30%, or about 0.1% to about 20%, or about 0.5% to about 20%, or about 1% to about 20%, or about 3% to about 20%, or about 5% to about 20%, or about 10% to about 20%, or about 15% to about 20%).

In various embodiments, the protein containing food product may comprise at least about 0.1% carbohydrate by weight, such as about 0.1%, or about 0.5%, or about 1%, or about 3%, or about 5%, or about 10% fat by weight. In various embodiments, the protein containing food product may comprise from about 0.1% to 40% carbohydrate by weight, and useful ranges may be selected from between any of these values (for example, from about 0.1% to about 40%, or about 0.5% to about 40%, or about 1% to about 40%, or about 3% to about 40%, or about 5% to about 40%, or about 10% to about 40%, or about 15% to about 40%, or about 20% to about 40%, or about 0.1% to about 35%, or about 0.5% to about 35%, or about 1% to about 35%, or about 3% to about 35%, or about 5% to about 35%, or about 10% to about 35%, or about 15% to about 35%, or about 20% to about 35%, or about 0.1% to about 30%, or about 0.5% to about 30%, or about 1% to about 30%, or about 3% to about 30%, or about 5% to about 30%, or about 10% to about 30%, or about 15% to about 30%, or about 20% to about 30%, or about 0.1% to about 20%, or about 0.5% to about 20%, or about 1% to about 20%, or about 3% to about 20%, or about 5% to about 20%, or about 10% to about 20%, or about 15% to about 20%).

In various embodiments, the protein containing food product may comprise at least about 10 kcal per 100 mL of the food product. In various embodiments, the protein containing food product may comprise from about 10 to about 400 kcal per 100 mL of the food product, and useful ranges may be selected from between any of these values (for example, from about 10 to about 400, 10 to about 350, or about 10 to about 300, or about 10 to about 300, or about 10 to about 250, or about 10 to about 200, or about 10 to about 150, or about 10 to about 100, or about 50 to about 400, or about 50 to about 350, or about 50 to about 300, or about 50 to about 300, or about 50 to about 250, or about 50 to about 200, or about 50 to about 150, or about 50 to about 100, or about 100 to about 400, or about 100 to about 350, or about 100 to about 300, or about 100 to about 300, or about 100 to about 250, or about 100 to about 200, or about 100 to about 150, or about 150 to about 400, or about 150 to about 350, or about 150 to about 300, or about 150 to about 300, or about 150 to about 250, or about 200 to about 400, or about 200 to about 350, or about 200 to about 300, or about 200 to about 350).

Flavour may be assessed using a trained sensory panel. For example, samples are evaluated by trained sensory panellists (n=8-12) utilising a sensory lexicon created during the attribute generation session. One attribute generation session and one training and calibration session are held prior to two consensus profiling evaluation sessions. With consensus profiling, members of the trained sensory panel work together to agree on intensity ratings (on a 0-150 mm line scale) for each sensory attribute rather than providing independent ratings in duplicate or triplicate. All samples are evaluated in duplicate across two sessions, with one sample evaluated in duplicate within each session. All samples are evaluated at room temperature (approximately 18-20° C.) and tasted under white lights in clear sample cups labelled with random 3 digit codes. The samples are presented to the panellists in a randomised order. Other sensory panels or alternative methods of assessing flavour will be apparent to a skilled worker.

The viscosity, particle size, % weight sediment, whiteness index, titratable acidity (TA), firmness/texture, overrun, and melt rate of the food product may be selected based on acceptable ranges depending on the protein-containing food product. These ranges will be known to a skilled worker.

Viscosity, % weight sediment, and whiteness index may be determined as previously described.

Particle size distribution may be determined using a Malvern Mastersizer 2000 (Malvern Instruments LTD, Malvern, Worcestershire, UK). Deionized water (refractive index (RI)=1.33) is used to disperse the sample and the refractive index of milk fat (RI=1.46) is used for the dispersed phase. Drops of sample are added until obscuration values of 10-15% are obtained. Particle sizes are reported as the surface weighted mean diameter (D [3,2]) and volume weighted mean diameter (D [4,3]). Other methods of determining particle size will be apparent to a skilled worker.

Titratable acidity may be measured according to the NZTM3: Chemical methods manual section 2.9: titratable acidity by Potentiometric titration for yoghurt. Other methods of determining TA will be apparent to a skilled worker.

Three textural parameters (i.e., hardness, cohesiveness, relative adhesiveness) of samples are observed using a TA.XT plus texture analyser (Stable Micro Systems Ltd., Godalming, Surrey, UK). Two sequential penetration events (cylindrical probe P20 with 20 mm diameter, penetration depth 10 mm, probe speed 2 mm s$^{-1}$, trigger force 5 g, strain of deformation 25%) are implemented during the measurements. The probe directly penetrates the samples product container. Results are recorded as force-displacement/time curves describing the force (N) needed to deform the sample proportionally with time (s). Values of hardness, cohesiveness and relative adhesiveness ae calculated. Each cup is used for penetration only once. The measurement is carried out at 6±2° C. (each sample was measured immediately after removing from a fridge where samples were stored). Other methods of determining firmness/texture will be apparent to a skilled worker.

The textural properties may be determined using a TAHD plus texture analyser (Stable Micro Systems Ltd., Godalming, Surrey, UK). Two sequential penetration events (Perspex cylindrical probe TA-5 with 0.5 inch diameter, penetration depth 20 mm, probe speed 1 mm s$^{-1}$, trigger force 5 g) are implemented during the measurements. The probe directly penetrates the samples product container. Results are recorded as force-displacement/time curves describing the force (N) needed to deform the sample proportionally with time (s). Values of fracture force (g) and firmness (g·sec) are generated. Each cup is used for penetration only once. The measurement is carried out at 6±2° C. (each sample was measured immediately after removing from a fridge where samples were stored).

Overrun may be calculated based on the weight of a certain volume of ice cream mix and ice cream. A container may be filled with either ice cream mix or ice cream and the weight recorded.

$$\text{Overrun (\%)} = \text{(weight of mix-weight of ice cream)}/\text{weight of ice cream mix} \times 100\%.$$

Other methods of determining overrun will be apparent to a skilled worker.

Melt rate may be measured in a 30° C. controlled chamber. Samples are stored at −14° C. for 24 hours prior to analysis. 160 g of ice cream is placed on a 2 mm stainless steel screen with a funnel and a graduated cylinder beneath to collect the melt. Timing of the melt-down rate begins when the first drop of melt touches the bottom of the cylinder. Volumes are recorded every 10 minutes for 60 minutes. Other methods of determining melt rate will be apparent to a skilled worker.

10. Additional Ingredients

In various embodiments, the one or more additional ingredients may be a lipid, a carbohydrate, flavour, vitamin, mineral, other milk product, water, fibre, thickening agent, emulsifier, stabiliser, food additive, colour, protein, or any combination of any two or more of these ingredients.

In various embodiments the lipid may be plant lipid or animal lipid, including dairy lipid and marine oils. Plant oils are often exemplary because of their ease of formulation and lower saturated fatty acid content. Exemplary plant oils include canola (rapeseed) oil, corn oil, sunflower oil, olive, soybean oil, or hydrogenated vegetable oil.

In various embodiments, the dairy lipid may be cream, butter, ghee, cooked milk fat, anhydrous milk fat (AMF), a hard milk fat extract from one or more stages of milk fat fractionation (including hard (H), soft-hard (SH), and soft-soft-hard (SSH) extracts), a soft milk fat extract from one or more stages of milk fat fractionation (including soft (S), soft-soft (SS), and soft-soft-soft (SSS) extracts), a combination of hard milk fat extracts, a combination of soft milk fat extracts, a combination of hard milk fat extracts and soft milk fat extracts, buttermilk, a phospholipid extract of buttermilk, butter serum, a phospholipid extract of butter serum, beta serum, a phospholipid extract of beta serum, a sphingolipid extract, a milk fat globule (or "globular") membrane lipid extract (including, for example, sphingolipids, ceramides, and cerebrosides), a phospholipid extract, a complex lipid extract, conjugate linoleic acid (CLA)-enriched milk fat, a CLA-enriched milk fat extract, a hydrolysate thereof, an extract of the hydrolysate, combinations of hydrolysed and/or non-hydrolysed compositions, or any combination of any two or more thereof. These compositions may be obtained from whole milk or colostrum, and any derivatives of whole milk or colostrum, including cream, cultured cream, and whey cream (milk lipid obtained from whey, including acid whey or cheese whey, preferably cheese whey). Cultured cream is cream from whole milk or colostrum that has been fermented with acid-producing microorganisms, preferably lactic acid bacteria.

In various embodiments, the plant oil may be coconut oil, corn oil, cottonseed oil, canola oil, rapeseed oil, olive oil, palm oil, peanut oil, ground nut oil, safflower oil, sesame oil, soybean oil, sunflower oil, nut oil, hazelnut oil, almond oil, cashew oil, macadamia oil, pecan oil, pistachio oil, walnut oil, oils from melon and gourd seeds, bottle gourd oil, buffalo gourd oil, pumpkin seed oil, watermelon seed oil, acai oil, blackcurrant seed oil, borage seed oil, evening primrose oil, carob seed oil, amaranth oil, apricot oil, argan oil, artichoke oil, avocado oil, babassu oil, ben oil, borneo tallow nut oil, cohune oil, coriander seed oil, flax oil, flax seed oil, coriander seeds oil, grape seed oil, hemp oil, kapok seed oil, kiwi fruit oil, lallemantia oil, linseed oil, mustard oil, okra seed oil, perilla seed oil, pequi oil, pine nut oil, poppyseed oil, prune kernel oil, quinoa oil, ramtil oil, rice bran oil, tea oil, wheat germ oil, or any combination of any two or more thereof.

In various embodiments, the marine oil may be shellfish oil, fish oil, marine algal oil, or any combination of any two or more thereof. In various embodiments the fish oil may be from anchovy, baikal, bloater, cacha, carp, eel, eulachon, herring, Hoki, hilsa, jack fish, katla, kipper, mackerel, orange roughy, pangas, pilchard, black cod, salmon, sardine, shark, sprat, trout, tuna, whitebait, or swordfish oils, or any combination of any two or more thereof.

In various embodiments, the carbohydrate may comprise monosaccharides, disaccharides, oligosaccharides and polysaccharides and mixtures thereof, including sugar, sucrose, and sucralose. Oligosaccharides of glucose are typically used. A number of these are commercially available as starch, maltodextrin (3-20 dextrose equivalents (DE)) or corn syrup for the longer chain carbohydrates (>20 DE). Non-digestible carbohydrates may also be included, for example, fructooligosaccharides, inulin, and galactooligosaccharides. These are typically present in amounts of 0.2-5% of the composition.

In various embodiments, the protein may be a dairy protein or a non-dairy protein. In various embodiments, the protein may be milk, whey, casein, caseinate, egg, egg white, egg yolk, meat, beef, lamb, fish, shellfish, vegetable, legume, alfalfa, clover, pea, bean, kidney bean, soybean, lentil, lupin, mesquite, cocoa, carob, nut, peanut, rye, cereal, whole wheat, rice, hemp, wheat gluten, fungal, or algal protein, a protein concentrate thereof, a protein isolate thereof, a hydrolysate thereof, or any combination of any two or more thereof.

In various embodiments, the protein may be a protein powder. The protein powder may be of any of the protein sources described. The protein powder may be non-agglomerated, agglomerated, roll-compacted, lyophilised, drum dried, spray dried or foam spray dried protein powder. In various embodiments the protein powder comprises a whey protein concentrate (WPC) or a whey protein isolate (WPI). In various embodiments the protein powder comprises whole milk powder, skim milk powder, or a milk protein concentrate (MPC).

In various embodiments the one or more additional ingredients may be flavours, including but not limited to sweeteners, natural flavours, nature identical flavours, artificial flavours, herbs, and spices.

In various embodiments the one or more additional ingredients may be vitamins. Vitamins may include fat-soluble or water-soluble vitamins. Suitable vitamins include but are not limited to vitamin C, vitamin A, vitamin E, vitamin B12, vitamin K, riboflavin, niacin, vitamin D, vitamin B6, folic acid, pyridoxine, thiamine, pantothenic acid, and biotin. The form of the vitamin may include salts of the vitamin, derivatives of the vitamin, compounds having the same or similar activity of a vitamin, and metabolites of a vitamin.

In various embodiments the one or more additional ingredients may be minerals, including, but not limited to chloride, sodium, calcium, iron, chromium, copper, iodine, zinc, magnesium, manganese, molybdenum, phosphorus, potassium, chromium, fluoride, and selenium. Suitable forms of any of the foregoing minerals include soluble mineral salts, slightly soluble mineral salts, insoluble mineral salts, chelated minerals, mineral complexes, non-reactive minerals such as carbonyl minerals, and reduced minerals, and combinations thereof.

In various embodiments the food product may comprise at least about 10, 20, 25, 30, 40, 50, 60, 70, 75, 80, 90 or 100% of the recommended daily intake (RDI) of vitamins and minerals as set by European (FSMP) or USDRA regulations in, for example, a 100 mL, 250 mL, 500 mL or 1 litre portion.

In various embodiments the one or more additional ingredients may be a food additive, including but not limited to starter culture, rennet, antifoams, stabilisers, emulsifiers, preservatives, thickening agents, fibre, probiotics, antioxidants, flavour enhancers, colours, acidity regulators.

In various embodiments, the food product may be thickened using different thickening agents to produce foods of different consistency (e.g. for patients suffering from dysphagia). Useful thickening agents include alginates, agar, carrageenan, locust bean gum, oat gum, guar gum, tragacanth gum, acacia gum, xanthan gum, karaya gum, tara gum, gellan gum, starch, and modified starch.

In various embodiments the one or more additional ingredients may be stabilisers or emulsifiers. Useful emulsifiers include antifoam, lecithins, mono and diglycerides, polyglycerol esters, milk phospholipids, citric acid esters (citrems), polysorbate 60, glyceryl monostearate, and datems. Useful stabilisers include carrageenan, gellan gum, pectin, guar gum, locust bean gum, carboxymethyl cellulose and microcrystalline cellulose or combinations thereof. Those of skill in the art will recognise that many different gum forms, in addition to those listed above are suitable for use in the compositions disclosed herein.

In various embodiments, the one or more additional ingredients may be salts or acidity regulators, such as sodium chloride, lactic acid, acetic acid, citric acid, potassium hydroxide, or tripotassium citrate.

In various embodiments, the one or more additional ingredients may be other milk products such as powdered MPC, skim milk powder, milk fat, or cream.

In various embodiments, the one or more additional ingredients may be a source of amino acids, amino acid precursors or amino acid metabolites or any combination of any two or more thereof, preferably free amino acids, amino acid precursors or amino acid metabolites.

In various embodiments, the one or more additional ingredients may be water, antifoam, sucrose, maltodextrin, lecithin, canola oil, stabilisers, milk powder; cream; bacterial starter culture such as *Lactobacillus bulgaricus* and *Streptococcus thermophilus* or mesophilic bacteria; carrageenan; xanthan gum; starch; flavours; non-heated treated liquid milk protein concentrates according to the invention, such as MPC470 or MPC4861; hydrogenated vegetable oil; salts; lactic acid; acetic acid; or rennet.

Methods of mixing the one or more additional ingredients with the milk protein concentrate to produce a protein-containing food product will depend of the protein-containing food product to be formed. These methods will be known to a skilled worker.

EXAMPLES

Example 1

Examples 1A-1C describe processes for preparing heat-treated liquid milk protein concentrates (MPCs) from fresh milk using ultrafiltration. The protein content of the MPCs is summarised in Table 1 below.

Properties of the MPCs indicative of storage stability were determined using methods described herein following storage at 20° C. for one week, 13 weeks or 16 weeks. The results are shown in Table 2.

Methods of Analysis

Viscosity was measured using an MCR302 rheometer (Anton Paar) with a cup and bob geometry. The sample was pipetted into the cup to the fill line and placed into the rheometer ensuring the sample was tempered to 20° C. before the measurement was started. The sample was subjected to a pre-shear of 300 s$^{-1}$ for 1 minute followed by a rest period of 1 minute prior to measurement. The sample is subjected to a shear rate sweep from 0.001-398 s$^{-1}$ with the viscosity taken at 39.8 s$^{-1}$ and 100 s$^{-1}$.

The pH of the samples was measured by equilibrating samples to 25° C. and measuring using a pH probe (EC620132, Thermo Scientific) after calibrating using standards at pH 4, 7, and 10 (Pronalys, LabServ).

The particle size distribution of the samples was measured using the Malvern Mastersizer 2000 (Malvern Instruments LTD, Malvern, Worcestershire, UK). Drops of sample were added into the water reservoir containing RO water until obscuration values of 10-15% are obtained. The background was measured prior to each sample measurement; samples were measured in duplicate. Particle sizes are reported as the surface weighted mean diameter (D [3,2]) and volume weighted mean diameter (D [4,3]).

The sediment was measured by filling the samples directly (or diluting to 10% protein first, where required) into pre-weighed centrifuge tubes and centrifuging at 1709×g for 30 minutes at 20° C. using a Heraeus Multifuge 1S-R (Thermo Scientific), with the swinging bucket rotor TTH 400. The supernatant is removed after configuration and the weight of the sediment remaining is calculated on a wet basis (w/w):

(wet sediment−tube weight)/(initial sample weight in tube)×100%

The colour and whiteness index (WI) was determined using a ColorFlex EZ (HunterLab) with the Universal programme. A standard white and black tile is used for calibration. The sports beverages were poured samples into the sample dish to the required level and placed on the instrument for measurement. The Whiteness index is reported as this gives an indication of any darkening of the samples, and is based on the L*,a*,b* colour space:

$$WI=100-\sqrt{((100-L^*)^2 a^{*2} b^{*2})}$$

Example 1A

This example describes a process to form a heat-treated liquid MPC using ultrafiltration.

Heat-treated, liquid MPC was prepared by fractionating fresh, pasteurised skim milk using a 4 stage, continuous ultrafiltration (UF) plant equipped with 5 kDa UF membranes. The UF processing continued until a retentate was produced with a total solids content of approximately 25 degrees Brix (° Br) (indicative of a total solids content of approximately 21%) or approximately 14% by weight total protein. Then diafiltration (DF) water was added to the retentate, and the UF processing continued until a retentate with 13.97% total protein, or 88% total protein on a dry basis was produced. The UF and DF processing temperature was constantly held at 10° C. The resulting liquid MPC was processed through a Tetra Pak LHT plant with a holding time of 144° C. for 4 seconds then cooled to 40° C. and aseptically packed.

Example 1B

This example describes a process to form heat-treated liquid milk protein concentrates of varying protein content using ultrafiltration and evaporation.

Heat-treated, liquid MPC was prepared by fractionating fresh, pasteurised skim milk using a 4 stage, continuous ultrafiltration (UF) plant equipped with 5 kDa UF membranes. The UF processing continued until a retentate was produced of approximately 25° Br or total protein content of approximately 14%. The retentate was diluted by demineralised water and further ultra-filtered (diafiltration or DF). The UF and DF processing temperature was constantly held at 10° C. UF/DF was processed until a total solids content of approximately 21° Br (indicative of a total solids content of approximately 17% by weight) and a total protein content of approximately 14% was achieved or 86-89% total protein on a dry basis was achieved. The resulting UF retentate was preheated to 55° C. and evaporated through an evaporator to either 20.6 or 22.5% TS. The resulting liquid MPC was processed through a Tetra Pak LHT plant with a holding time of 144° C. for 4 seconds then cooled to 40° C. and aseptically packed.

Example 1C

This example describes a process to form heat-treated calcium depleted liquid milk protein concentrates of varying protein content using ultrafiltration and evaporation and including a calcium depletion step.

Heat-treated, liquid MPC was prepared by fractionating fresh, pasteurised skim milk using a 4 stage, continuous ultrafiltration (UF) plant equipped with 5 kDa UF membranes. The UF processing continued until a retentate of approximately 25° Br or total protein content of approximately 14% was produced. Then diafiltration (DF) water was added to the retentate, and the UF processing continued to produce DF retentates. The UF and DF processing temperature was constantly held at 10° C. UF/DF was processed until a retentate of approximately 21° Br and a protein content of approximately 14% was achieved. A portion of the retentate was diluted and the pH lowered to 5.85 with 5% lactic acid. The retentate was passed through a column containing Rohm Haas Amberlite SR1L for 100% calcium depletion by sodium ion exchange. The depleted retentate was blended back with un-depleted retentate to achieve 15% calcium depletion. The final pH was 6.93 and no further pH adjustment was made.

The resulting UF retentate was preheated to 55° C. and evaporated to 19.7% TS. The resulting liquid MPC was processed through a Tetra Pak LHT plant with a holding time of 144° C. for 4 seconds then cooled to 20° C. and aseptically packed.

The protein content of the liquid MPCs prepared as described in Examples 1A-1C is summarised in Table 1. The properties of the liquid MPCs are presented in Table 2.

TABLE 1

Protein content of liquid MPCs produced according to Examples 1A to 1C.

| Retentate | Total protein by weight after UF | Total protein on a dry basis after UF | Manufacturing method (example reference) |
|---|---|---|---|
| 1 | 10.02% | 63% | UF only (1A) |
| 2 | 13.21% | 70% | UF only (1A) |
| 3 | 13.97% | 88% | UF/DF (1A) |
| 4 | 14.10% | 86% | UF/DF (1A) |
| 5 | 18.31% | 88% | UF/DF retentate subject to evaporation (1B) |
| 6 | 20.3% | 89% | UF/DF retentate subject to evaporation (1B) |
| 7 | 17.55% | 89% | UF/DF retentate subject to evaporation. Calcium depletion of retentate (1C) |

TABLE 2

Storage stability of liquid MPCs produced according to Examples 1A-1C.

| Sample | Storage time at 20° C. (weeks) | Viscosity (mPa · s) @ 39.8 s$^{-1}$ | Viscosity (mPa · s) @ 100 s$^{-1}$ | Colour (whiteness index) | Particle size distribution (μm) D[4, 3] | Particle size distribution (μm) D[3, 2] | pH | Sediment % wet sediment |
|---|---|---|---|---|---|---|---|---|
| 1 | 13 | 6.43 | 6.44 | 83.04 | 0.139 | 0.112 | 6.50 | 0.60 |
| 2 | 13 | 26.2 | 24.2 | 81.40 | 0.157 | 0.114 | 6.48 | 0.54 |
| 3 | 13 | 23 | 22 | 85.73 | 0.709 | 0.117 | 6.76 | 1.06 |
| 4 | 4 | 50.3 | 44.1 | 84.34 | 0.131 | 0.103 | 6.91 | 0.50 |
| 5 | 16 | 640 | 376 | 82.94 | 0.132 | 0.104 | 6.59 | 0.72 |
| 6 | 16 | 2180 | 1110 | 81.81 | 0.134 | 0.105 | 6.64 | 1.40 |
| 7 | 16 | 415 | 298 | 83.06 | 0.143 | 0.113 | 6.59 | 0.61 |

Example 2

This example describes the process to form heat-treated liquid milk protein concentrates of varying protein content using ultrafiltration with the addition of cream to produce a high fat milk protein concentrate.

Heat-treated, liquid MPC was prepared by fractionating fresh, pasteurised skimmed milk using a 4 stage, continuous ultrafiltration (UF) plant equipped with 5 kDa UF membranes. The UF processing continued until a retentate of approximately 21° Br or total protein content of approximately 14% was produced. Dairy cream from the whole milk was blended back to the retentate at a protein to fat ratio of approximately 1:1. The resulting high fat MPC was processed through a Tetra Pak LHT plant with a holding time of 144° C. for 4 seconds then homogenised at (150/50 bar) and cooled to 20° C. and aseptically packed.

The properties of the high fat MPC were analysed after two weeks storage at 20° C. using the methods described above for Example 1. The results are as follows.

11.03% protein, 11.40% fat,

Total protein on a dry basis after UF=71%, pH=6.72, particle size of 0.778 μm volume weighted mean D[4,3], and 0.6% wet sediment when diluted to 10% protein.

Example 3

This example describes sensory evaluation of liquid milk protein concentrates produced by the methods described in Examples 1B and 1C after storage at ambient temperature.

Sample Details

Sample details are provided in Table 3. All samples were stored at 20° C. following production. Before sensory analysis, all samples were adjusted to 10% total solids with 50° C. water and mixed for about 2-5 minutes.

A comparative sample was prepared by reconstituting MPC85 powder (MPC 4850, Fonterra Cooperative, Auckland, New Zealand) in water at 50° C. to produce a sample comprising 10% total solids. The powder was added slowly to the water which was mixing so that a vortex was formed; powder addition took about 5 minutes. The solution was left to mix for 30 minutes to allow particles to dissolve.

TABLE 3

Liquid MPCs tested by sensory panel following dilution to 10% total solids compared to MPC powder at 10% total solids.

| Sample number from Table 1 | MPC source | Storage duration |
|---|---|---|
| 4 | Liquid MPC 14% protein | 9 months |
| 5 | Liquid MPC 18% protein | 6 months |
| 7 | Ca depleted Liquid MPC 18% protein | 6 months |
| 6 | Liquid MPC 20% protein | 6 months |
| — | MPC powder | 9 months |

Sensory Methodology Details

All samples were evaluated by each participant (n=7). Panellists were asked to taste the samples one at a time and describe the flavours and textures of each sample. Samples were evaluated at room temperature (approximately 18-20° C.) and tasted under white lights in clear sample cups labelled with random 3-digit codes. The samples were presented to the panellists in a randomised order. Panellists were asked to cleanse their palates with soda water between tasting each sample.

Results

Sample Preparation Observations

The time to reconstitute each sample and observations during reconstitution are described in Table 4.

TABLE 4

Sample preparation observations of liquid MPCs versus powdered MPC

| Sample | Observation |
|---|---|
| Liquid MPCs | Water and liquid MPC combined easily in a beaker, sample dissolved almost instantly, 2-5 minutes stirring required. |
| MPC powder | Powder added slowly into the vortex of water created by the stirrer. If added quickly, lumps formed. Once all powder had dispersed (about 5 mins), stirring for 30 minutes was required to complete mixing. |

Flavour and Texture

Panellists' observations are shown in Table 5.

TABLE 5

Panellist comments of liquid MPCs and MPC powder.

| Ref | Sample | Comment on flavour | Comments on texture |
|---|---|---|---|
| 4 | Liquid MPC 14% protein | No flavour, slightly bland, slight gluey, slight milky flavour (3), creamier flavour (2), less creamy, bitter, less protein flavour, watery compared to others, thinner than 255 (MPC powder) | Watery compared to others, thinner than 255 (MPC powder) |
| 5 | Liquid MPC 18% protein | Slight pasty, no flavour, milky (3), slight cardboard, flavour, no cardboard flavour, less protein flavour, cooked, caramel, plain | Watery (2), thin (2), thicker, astringent |
| 8 | Calcium depleted Liquid MPC 18% protein | Pasty, no flavour, slight carboard, no cardboard, less intense protein, not bitter, minimal aftertaste, milky (3), clean (2) | Thick (3), thinner, watery |
| 7 | Liquid MPC 20% protein | Bland<br>No flavour<br>Slight milky (2)<br>Protein/Wet wool<br>Slightly sweet<br>No cardboard | Thin (2)<br>Watery<br>Slight toothcoating<br>Slight mouthcoating (2)<br>Slight astringent<br>Thicker |
| — | MPC powder | Milky (3), cardboard (2), protein flavours (casein) (2), slight wet wool, slight cooked (2), not bitter, less intense protein | Powdery, more mouthcoating, foamy, slightly thick (3), slight astringent (3), watery, creamy texture |

\* Numbers in brackets indicate the number of panellists (if more than one) who made the same comment.

Flavour Intensity Ranking

Panellists ranked the samples from lowest to highest flavour intensity. The results are shown in Table 6.

TABLE 6

MPC samples rank order collation.

| Ref | Sample | Number of panellists who ranked as lowest intensity | Number of panellists who ranked as highest intensity |
|---|---|---|---|
| 4 | Liquid MPC 14% protein | 2 | 0 |
| 5 | Liquid MPC 18% protein | 0 | 0 |
| 7 | Ca depleted Liquid MPC 18% protein | 0 | 1 |
| 6 | Liquid MPC 20% protein | 5 | 1 |
| — | MPC powder | 0 | 5 |

Example 4

This example describes a process to form a heat-treated liquid milk protein concentrate using microfiltration and ultrafiltration.

Fresh, pasteurised skim milk was concentrated to 12% TS at 50° C. on a batch Tetra Alcross MFS-19 microfiltration plant equipped with 0.1 μm Membralox ceramic membranes with a surface area of 3.8 m². A volume concentration factor of 3 and increase of casein:whey protein ratio from 4:1 to 9:1 was achieved. Demineralised water was added to the resulting MF retentate and concentrated on a 5 kDa Synder UF membrane with a surface area of 16 m², at 10° C. until the total solids concentration reached 16%. The resulting UF retentate was preheated to 55° C. and evaporated through an evaporator to 19% TS. The resulting liquid MPC was processed through a Tetra Pak LHT plant with a holding time of 144° C. for 4 seconds then cooled to 20° C. and aseptically packed.

The properties of the liquid MPC were analysed after one month storage at 20° C. using the methods described above for Example 1. The results are as follows.

15.4% protein,
whiteness index of 86.35,
pH=6.79,
viscosity of 91.5 mPa·s at 39.8 s$^{-1}$, and 74.1 mPa·s at 100 s$^{-1}$,
particle size of 0.09 μm volume weighted mean D[4,3], and
0.3% wet sediment when diluted to 10% protein.

Example 5

This example describes use of the heat-treated liquid milk protein concentrate compared to a powdered milk protein concentrate in the production of a liquid nutritional composition.

A high protein liquid nutritional composition was prepared from a 14% total protein liquid milk protein concentrate (MPC samples 3 and 4 as shown in Table 4) as follows:
1. The liquid MPC was added to water at 50° C. and mixed gently for approximately 10 minutes.
2. The carbohydrate ingredients were dry blended and added to the protein solution and mixed for 5 minutes until completely dissolved.
3. A premix of minerals was hydrated in water and added to the batch.
4. A blend of liquified oils and emulsifiers at 50° C. were added. The batch was homogenised at 7000 rpm for 3 minutes using an Ultra-Turrax.
5. The batch was made up to 17900 g with water and heated to 60° C.
6. The premix solution was homogenised at 60° C., 200/50 bar. The pH was adjusted to 6.8 using 10% potassium hydroxide after cooling to 25° C.
7. The homogenised mix was UHT sterilised at 143° C. for 5 sec after pre-heating to 80° C.

A high protein liquid nutritional composition from fresh liquid milk protein concentrate was also prepared using the method above. The fresh MPC was prepared like example 1, however the UHT step was not done; instead the MPC was stored at 4° C. overnight until further processing into the liquid nutritional composition.

A high protein liquid nutritional composition from powdered MPC was prepared as follows:
1. Water was tempered to 50° C. and combined with antifoam.
2. The dry blended MPC powders were slowly added into the water-antifoam mixture over 15 minutes.
3. The premix solution was mixed at 50° C. for 60 minutes.
4. Carry out steps 2-6 of the process for the liquid MPC above.

The production of the high protein liquid nutritional composition from the liquid MPC required less time for hydrating the liquid MPC versus the powder (about 10 minutes versus 60 minutes). No foaming occurred when the liquid MPCs were hydrated, unlike the powder, therefore the use of antifoam was not required for liquid.

The high protein liquid nutritional composition was prepared using the following ingredients in Table 7.

TABLE 7

Formulation of the high protein liquid nutritional compositions.

| Ingredient (g) | From powder | From liquid MPC- Sample 3 Table 1 | From liquid MPC- Sample 4 Table 1 | From fresh MPC |
|---|---|---|---|---|
| MPC powder | 2036 | | | |
| Liquid MPC (14% protein) | | 12036 | 12036 | |
| Fresh MPC (14% protein) | | | | 12036 |
| Sugar | 360 | 360 | 360 | 360 |
| Maltodextrin | 1998 | 1998 | 1998 | 1998 |
| Minerals | 36.6 | 36.6 | 36.6 | 36.6 |
| Lecithin | 28.8 | 28.8 | 28.8 | 28.8 |
| Canola oil | 966 | 966 | 966 | 966 |
| Xiameter(R) AFE-1530 Antifoam emulsion | 0.2 | 0 | 0 | 0 |
| Water | 12500 | 2500 | 2500 | 2500 |
| Total (g) | 17925.4 | 17925.4 | 17925.4 | 17925.4 |

The prepared liquid nutritional composition comprises the following macronutrients in Table 8. The pH, viscosity and particle size of the compositions were determined using the methods described for Example 1 above.

TABLE 8

Macronutrient levels and functional properties of nutritional compositions, measured 22 days after production.

| g/100 g | MPC powder | Liquid MPC- Sample 3 Table 1 | Liquid MPC- Sample 3 Table 1 | Fresh liquid MPC |
|---|---|---|---|---|
| Total Protein | 8.93 | 9.38 | 8.74 | 9.31 |
| Fat | 5.51 | 5.47 | 5.44 | 5.38 |
| Carbohydrates | 12.84 | 12.76 | 12.80 | 12.98 |
| of which lactose | 3.77 | 4 | 3.83 | 3.83 |
| Ash | 1.02 | 0.99 | 0.92 | 0.93 |
| Total solids | 28.3 | 28.6 | 27.9 | 28.6 |
| pH | 6.73 | 6.76 | 6.75 | 6.79 |
| Viscosity (Pa·s) at 39.8 s−1 | 0.0231 | 0.0412 | 0.0296 | ND- |
| Viscosity (Pa·s) at 100 s−1 | 0.0212 | 0.0366 | 0.0269 | ND- |
| Particle size D [4, 3] μm | 0.245 | 0.265 | 0.218 | 0.25 |
| Particle size D [3, 2] μm | 0.153 | 0.160 | 0.107 | 0.15 |

Example 6

This example describes sensory evaluation of liquid nutritional compositions produced by the method described in Example 5.

Sample Details

The liquid nutritional composition samples were tasted after food safety results proved samples were safe for human consumption.

All samples were stored at 4° C. for 22-23 days after production.

Sensory Methodology Details

The samples were evaluated by 62 dairy scientists. The first part involved participants ranking the samples from lowest to highest overall flavour intensity and were asked to comment on why the lowest and highest samples were chosen. Participants were then asked a preference question "overall, which sample do you prefer the most?". Samples were evaluated at room temperature (approximately 18-20° C.) and tasted under red lights in sensory booths in lidded, clear sample cups labelled with random 3-digit codes. The samples were presented to the participants in a randomised order.

Plain Liquid Nutritional Compositions—Ranking

Liquid nutritional composition made from MPC85 powder was ranked as the most intense strong flavour overall (highest rank total score) and was significantly more intense than liquid nutritional composition made from Liquid MPC sample 4 at a 10% significance level (shown in Table 9).

TABLE 9

Rank of intensity and description of flavours.

| Sample name | Rank total* | Comment as to why sample was ranked highest and lowest # |
|---|---|---|
| MPC85 powder | 174$^a$ | Artificial aftertaste, astringent, caseinate-like, high cardboard (2), highest musty/dirty sock aroma, lingering acidity, little sour/more acidic (2), metallic, more bitter (4), more creamy (2), most oxidised, powdery, sharper dirty flavour, strong aftertaste, strong beany (3), strong burnt, strong floury, strong protein flavour (4), strong unpleasant flavour (4), strongest flavour (5), sweetest (12), thicker (2), unpleasant smell, very animal, very musty, very strong stevia/sweetener flavour (2), whey protein flavour |
| Fresh liquid MPC | 155$^{ab}$ | Bland (3), sweet (9), watery (2), lacked protein flavour, low sweetness (5), artificial, low flavour (2), creamy, thick (2), flavour lingered, less cooked, less cereal, beany (soy) flavour, more cereal, milk flavour, less milky/creamy (3), strong flavour, bitter |
| Liquid MPC-Sample 3, Table 1 | 142$^{ab}$ | No flavour (2), mild (3), less beany (2), bland (2), less astringent, lowest wet wool, less floury, low powdery, thinnest, bitter aftertaste, less stale/oxidised, strong flavour (2), sweet (4), milky |
| Liquid MPC-Sample 4, Table 1 | 139$^b$ | Creamy (3), closest to milk, fresh, least intense (5), less sweet, lowest musty/dirty sock aroma, mildest flavour, milk flavour, no off flavour, no protein flavour, no strong smell, plain, quite milky, quite pleasant aftertaste, smooth, thicker (2) |

*Rank totals that do not share a superscript letter are significantly different. Pairwise comparisons performed using Tukey's HSD control for maximum experiment-wise error rate and can be used regardless of the sample p-value. Tukey's HSD = 32.68 (significance level p < 0.10)
Numbers in brackets indicate the number of participants (if more than one) who made the same comment Liquid Nutritional Compositions—Preference The liquid nutritional compositions made from the liquid MPCs samples 3 and 4 were significantly more preferred than a liquid nutritional composition made from MPC85 powder at a 5% significance level (shown in Table 10). Samples are ordered from most preferred down to least preferred and count refers to the number of participants who preferred that sample.

TABLE 10

Liquid nutritional compositions preference results

| Sample name | Count * |
|---|---|
| Liquid MPC-Sample 4 Table 1 | 21$^a$ |
| Liquid MPC-Sample 3 Table 1 | 20$^a$ |
| Fresh liquid MPC | 12$^b$ |
| MPC85 powder | 7$^b$ |

* Counts that do not share a superscript letter are significantly different.

Example 7

The following examples describe the production of yoghurt from a heat-treated liquid MPC and a calcium-depleted liquid MPC and compares the properties and sensory attributes of the yoghurts to that of yoghurts prepared from MPC powder.

Methods of Analysis

The pH of the yoghurts was measured post-fermentation after cooling the samples to 20° C. and stirring the samples to break the gel structure. The pH was measured as described in Example 1. The appearance of the samples was assessed by using a spoon to scoop the yoghurt and a qualitative assessment of the textural properties from the point of the consumer was made. The fracture force and firmness of the yoghurts was measured using a TA-TX2 texture analyser as described in Example 1. The results are shown in Table 13.

Example 7A

This example describes the use of the heat-treated liquid milk protein concentrate compared to a powdered milk protein concentrate in the production of a yoghurt.

High protein artisanal set yoghurts were prepared from heat-treated liquid MPC as follows:
1. Skim milk powder was added to 60° C. water and 18% protein liquid MPC (Sample 5, Table 1) was added once the powder was dissolved.
2. The mix was cooled to 42° C.
3. The mix was inoculated with starter culture.
4. The mix was poured into cups and fermented at 42° C. until at least a pH of 4.6 was reached.
5. The yoghurt was cooled to 4° C.

High protein artisanal set yoghurts were prepared from powdered MPC85 as follows:
1. A dry blend of skim milk powder and MPC85 powder was added to 60° C. water and mixed for 60 minutes.
2. Steps 3-6 of the process for the liquid MPC above were performed.

The ingredient composition of the yoghurts is shown in Table 11.

TABLE 11

Ingredient composition of high protein artisanal set yoghurts.

| | 6% protein | | 9% protein | |
|---|---|---|---|---|
| Ingredients (g) | Liquid | Powder | Liquid | Powder |
| Liquid MPC (Sample 5 Table 1) | 328.2 | 0 | 656 | 0 |
| Milk protein concentrate powder | 0 | 74.3 | 0 | 148.6 |
| Skim milk powder | 183.4 | 183.4 | 183.4 | 183.4 |
| Yoghurt culture YF-L702 (Chr. Hansen A/S) | 0.06 | 0.06 | 0.06 | 0.06 |
| Water | 1488.34 | 1742.24 | 1158.34 | 1667.94 |
| Total (kg) | 2 | 2 | 2 | 2 |

The macronutrient content of the yoghurts is shown in Table 12.

TABLE 12

Macronutrient composition of 6% and 9% yoghurts.

| Macronutrient (g) | Per 100 g 6% protein | Per 100 g 9% protein |
|---|---|---|
| Protein | 6 | 9 |
| Fat | 0.1-0.14 | 0.1-0.2 |
| Carbohydrates | 4.9-5.3 | 4.9-5.3 |

The pH, appearance and textural properties of the reduced calcium artisanal set yoghurts are shown in Table 13.

TABLE 13

Properties of artisanal set yoghurts produced from liquid MPC and powdered MPC.

| Property | 6% protein | | 9% protein | |
|---|---|---|---|---|
| | Powder | Liquid | Powder | Liquid |
| pH post-fermentation | 4.23 | 4.32 | 4.45 | 4.46 |
| Appearance | Firm, brittle gel | Smooth, soft | Firm, brittle gel | Smooth, soft |
| Texture: Fracture force (g) | 106.3 | 34.8 | 252.7 | 54.3 |
| Texture: Firmness (g · mm) | 2210.3 | 647.6 | 4102.3 | 1255.7 |

Example 7B

This example describes the use of a heat-treated, calcium depleted liquid milk protein concentrate compared to a powdered, calcium depleted milk protein concentrate in the production of a yoghurt.

High protein artisanal set yoghurts from heat-treated, calcium depleted liquid MPC (Sample 7, Table 1) or calcium depleted powdered MPC were prepared using the methods described in Example 7A.

The ingredient composition of the yoghurts is shown in Table 14.

TABLE 14

Ingredient composition of high protein artisanal set yoghurts prepared from heat-treated, calcium-depleted liquid MPC or powdered, calcium-depleted MPC.

| Ingredients (g) | 6% protein | | 9% protein | |
|---|---|---|---|---|
| | Powder | Liquid | Powder | Liquid |
| Calcium depleted liquid MPC (Sample 7) | 0 | 342.4 | 0 | 684 |
| Calcium depleted MPC powder | 74.2 | 0 | 148.4 | 0 |
| Skim milk powder | 183.4 | 183.4 | 183.4 | 183.4 |
| Yoghurt culture YF-L702 (Chr. Hansen A/S) | 0.06 | 0.06 | 0.06 | 0.06 |
| Water | 1740.14 | 1474.14 | 1668.14 | 1130.34 |
| Total (kg) | 2 | 2 | 2 | 2 |

The macronutrient content of the reduced calcium yoghurts is shown in Table 15.

TABLE 15

Macronutrient composition of 6% and 9% calcium depleted yoghurts

| Macronutrient (g) | Per 100 g 6% protein | Per 100 g 9% protein |
|---|---|---|
| Protein | 6 | 9 |
| Fat | 0.1-0.14 | 0.1-0.2 |
| Carbohydrates | 4.9-5.3 | 4.9-5.3 |
| Calcium (mg/10 g) | 169-171 | 224-228 |

The yoghurts prepared from the liquid MPC were soft. The products produced from powdered MPC were very firm and gel-like.

The pH, appearance and textural properties of the reduced calcium artisanal set yoghurts are shown in Table 16.

TABLE 16

Properties of artisanal set yoghurts produced from liquid MPC and powdered MPC.

| Property | 6% protein | | 9% protein | |
|---|---|---|---|---|
| | Powder | Liquid | Powder | Liquid |
| pH post-fermentation | 4.34 | 4.30 | 4.46 | 4.46 |
| Appearance | Firm, brittle gel | Smooth, soft | Firm, brittle gel | Smooth, soft |
| Texture: Fracture force (g) | 106.3 | 40.2 | 120.1 | 68.2 |
| Texture: Firmness (g · mm) | 1392.3 | 769.0 | 2183.9 | 1568.3 |

Example 7C

This example describes sensory evaluation of artisanal set yoghurts produced by the methods described in Examples 7A and 7B.

Sensory Methodology Details

Panellists (n=13) were asked to complete a series of Tetrad tests whereby the panellists were given four samples and asked to group the samples into two groups of two based on similarity and then explain why the samples were grouped together. Each test contained two sets of two identical samples. Samples were evaluated at approximately 5° C. and tasted under white lights in lidded, clear sample cups labelled with random 3-digit codes. The samples were presented to the panellists in a randomised order. Panellists were asked to cleanse their palates with soda or filtered water between tasting each sample.

The sensory data was collected using Compusense Cloud® where routine statistical analysis was performed on the data and comments for sample groupings collated.

6% Protein Standard Yoghurts

Panellists evaluated 6% protein yoghurts prepared in Example 7A.

All 13 panellists correctly grouped duplicate samples of each yoghurt correctly and commented that the differences were very clear between the samples. Table 17 provides the sample grouping comments.

TABLE 17

Comments for sample groupings for 6% protein yoghurt samples

| Sample | Comment on flavour | Comments on texture |
|---|---|---|
| 6% protein yoghurt standard MPC powder | Chemical flavour (2), not creamy, chalky, animal, sour/acidic (6), salty, bitter, not nice in your mouth, less sour, metallic flavour, protein flavour | Very grainy/gritty/rough (6), much firmer (5), sticky hard/solid (3), lumpy, powdery (5), astringent rubbery/gel (3), curd like (2), texture not like yoghurt (2), thick, chewy |

TABLE 17-continued

Comments for sample groupings for 6% protein yoghurt samples

| Sample | Comment on flavour | Comments on texture |
|---|---|---|
| 6% protein yoghurt standard liquid MPC | More milky, clean flavour (2), sour/acidic (2), animal, salty (2), less sour/acidic (3), fresh, blander, bitter, creamy flavour, off flavour, protein flavour | Soft (5), creamy texture (4), not grainy, smooth (7), less powdery (2), astringent (2), nice texture, thin, good yoghurt texture |

* Numbers in brackets indicate the number of panellists (if more than one) who made the same comment.

6% Protein, Reduced Calcium Yoghurts

Panellists evaluated 6% protein, reduced calcium yoghurts produced according to Example 7B.

12 out of the 13 panellists grouped the samples correctly. Sample comments for the groupings are shown in Table 18.

TABLE 18

Comments for sample groupings for 6% protein, calcium depleted yoghurt samples

| Sample | Comment on flavour | Comments on texture |
|---|---|---|
| 6% protein yoghurt calcium depleted MPC powder | Bland, less acidic, salty, acidic/sour (6), chemical flavour (2), lacking milky flavour, not creamy, low overall flavour, animal flavour, clean flavour, metallic flavour, bitter aftertaste, protein flavour, off flavour | Grainy/gritty (5), more solid/hard (3), gel like, not nice texture, rubbery, thick, very firm (5), cuttable, powdery (5), curd like texture, rough mouthfeel, astringent (2) |
| 6% protein yoghurt liquid calcium depleted MPC | Acidic/sour (2), less acidic/sour (2), cleaner flavour (2), milky flavour, animal flavour, salty (2), sharp flavour, bitter taste, mild flavour, off flavour, protein flavour, cardboard flavour | smooth (9), soft (4), creamy (3), sticky, astringent (5), nice texture, less firm (3), slight powdery |

* Numbers in brackets indicate the number of panellists (if more than one) who made the same comment.

9% Protein Standard Yoghurts

Panellists evaluated 9% protein yoghurts produced according to Example 7A.

All 13 panellists grouped the samples correctly. Panellists also commented that the differences were very clear between the samples. Sample comments for the groupings are shown in Table 19.

TABLE 19

Comments for sample groupings for 9% protein yoghurt samples

| Sample | Comment on flavour | Comments on texture |
|---|---|---|
| 9% protein yoghurt standard MPC powder | Slight chemical flavour, low milky/creamy flavour, cheesy, bland/less flavour (2), sharp acidic taste (2), off flavour, old socks, protein flavour, unpleasant flavour, slight less acid | Very firm (6), grainy (5), like grainy set ricotta cheese, solid/hard (2), powdery (5), chewy (3), lumpy mouthfeel (2), rough mouthfeel, rubbery (2), dry, sticky, thick, almost cheese, particles, synereses in mouth, not creamy texture, no mouthfeel coating, curd like |

TABLE 19-continued

Comments for sample groupings for 9% protein yoghurt samples

| Sample | Comment on flavour | Comments on texture |
|---|---|---|
| 9% protein yoghurt standard liquid MPC | More milky/creamy flavour, acidic/sour (6), less sour, bland, chemical aftertaste, dairy flavour, cardboard flavour, cowy, cultured, clean flavour | Very smooth (12), creamier texture (6), thinner (2), much softer (6), less firm, less grainy (2), thick, mouth drying/astringent (3), no syneresis, firm |

* Numbers in brackets indicate the number of panellists (if more than one) who made the same comment.

9% Protein, Reduced Calcium Yoghurts

Panellists evaluated 9% protein, reduced calcium yoghurts produced according to Example 7B.

All 13 panellists grouped the samples correctly. Sample comments for the groupings are shown in Table 20.

TABLE 20

Comments for sample groupings for 9% protein, calcium depleted yoghurt samples

| Sample | Comment on flavour | Comments on texture |
|---|---|---|
| 9% protein yoghurt calcium depleted MPC powder | Acidic/sour (5), low dairy flavour (2), slight chemical flavour, bland, sharp flavour, no creamy flavour, metallic, unpleasant flavour, animal flavour, protein flavour, less flavour | Less powdery, powdery (3), rubbery (2), grainy (7), chewy, like set ricotta cheese, syneresis, firm (5), not smooth, astringent/dry (2), no creamy texture, thick (2), more solid, cheesy texture, hard, curd like, particles |
| 9% protein yoghurt liquid calcium depleted MPC | Acidic/sour (4), salty, more dairy flavour, bland, less acidic, chemical aftertaste, metallic aftertaste, animal flavour, yoghurt flavour | Powdery (2), smooth (9), creamy texture (8), astringent (2), softer (4), less firm, less grainy, thick, slight rough mouthfeel, small particles, good texture when stirred too |

* Numbers in brackets indicate the number of panellists (if more than one) who made the same comment.

Example 8

This example describes the use of heat-treated liquid milk protein concentrates compared to a powdered milk protein concentrate in the production of high protein (9%) sports beverages.

Sports beverages from 18% protein liquid MPC (either standard or calcium-depleted) were prepared as follows:
1. Liquid MPC was added to water.
2. Tri-potassium citrate and Di-magnesium phosphate were added to the premix and mixed at 60° C.
3. Citric acid was added to the premix.
4. The premix was heated with shear to 90° C. with a 5-minute holding time.
5. The heated solution was cooled to 4° C.

Sports beverages from powdered MPC were prepared as follows:
1. Water was heated to 60° C.
2. MPC powder was added slowly to the blender with shear at 60° C.
3. The premix was mixed for 30 minutes.
4. Steps 3-6 of the process for the liquid MPC above were conducted.

The ingredient composition of the 9% protein sports beverages is shown in Table 21. The macronutrient composition of the beverages is shown in Table 22.

TABLE 21

Ingredient composition of sports beverages comprising standard or calcium-depleted liquid MPC or MPC powder.

| Ingredient (g) | Standard MPC | | Calcium-depleted MPC | |
| --- | --- | --- | --- | --- |
| | Liquid | Powder | Liquid | Powder |
| Liquid MPC (Sample 5, Table 1) | 1050 | | | |
| Calcium-depleted MPC (Sample 7, Table 1) | | | 1096 | |
| MPC powder | | 235 | | |
| Calcium-depleted MPC powder | | | | 234 |
| Tripotassium citrate | 8.6 | 8.6 | 8.6 | 8.6 |
| Dimagnesium phosphate | 3.2 | 3.2 | 3.2 | 3.2 |
| Antifoam (Xiameter(R) AFE-1520 Antifoam Emulsion) | | 0.2 | | 0.2 |
| Citric acid (10%) | 10 | 10 | 10 | 10 |
| water | 928 | 1743 | 882 | 1744 |
| Total (kg) | 2 | 2 | 2 | 2 |
| Calcium (mg/kg) | 211 | 211 | 187 | 190 |

TABLE 22

Composition of sports beverages comprising standard or calcium-depleted liquid MPC or MPC powder.

| Macronutrient (g) | Standard MPC | | Calcium-depleted MPC | |
| --- | --- | --- | --- | --- |
| | Liquid | Powder | Liquid | Powder |
| Protein | 9.62 | 9.62 | 9.62 | 9.62 |
| Fat | 0.07 | 0.18 | 0.08 | 0.18 |
| Carbohydrates | 0.43 | 0.52 | 0.38 | 0.48 |
| Energy (kJ/100 g) | 173 | 179 | 166 | 178 |

The viscosity, pH, sediment and colour of the 9% protein sports beverages were measured using the methods described in Example 1. Results are shown in Table 23.

TABLE 23

Properties of sports beverages comprising standard or calcium-depleted liquid MPC or MPC powder.

| Property | Standard MPC | | Calcium-depleted MPC | |
| --- | --- | --- | --- | --- |
| | Liquid | Powder | Liquid | Powder |
| pH | 6.79 | 6.8 | 6.75 | 6.82 |
| Viscosity at 100 $s^{-1}$ (mPa·s) | 11 | 17 | 8 | 16 |
| Sediment (%) | 0.87 | 2.87 | 0.62 | 2.30 |
| Colour (L*a*b*) | 88.04, −2.78, 8.47 | 87.37, −3.74, 11.68 | 88.76, −2.61, 9.27 | 84.75, −4, 13.18 |
| WI | 85.08 | 82.40 | 85.20 | 79.45 |

Example 8A

This example describes sensory evaluation of the liquid sports beverages described in Example 8.

Sensory Methodology Details

Panellists (n=12) were asked to complete a series of Tetrad tests as described above for Example 7B.

Standard Sports Beverages

All 12 panellists grouped the samples correctly. Sample comments for the groupings are shown in Table 24.

TABLE 24

Comments for sample groupings for 9.6% protein samples from liquid MPC or MPC powder.

| Sample | Comments on appearance | Comment on flavour and aftertaste | Comments on texture |
| --- | --- | --- | --- |
| Sports beverage MPC powder | More yellow colour (3) | More milky, sweeter, better balance, bitter taste, cardboard flavour (3), lactic flavour, cooked flavour (2), salty taste (3), slightly creamy, cooked aftertaste, empty flavour | Thicker mouthfeel (6), less astringent, more astringent, powdery (2), slimy, thin |
| Sports beverage liquid MPC | Lighter white colour (2) | More protein flavour (2), minor differences, not very nice without flavour, less cardboard flavour, less bitter taste, bland, not much dairy flavour, less salty, less cooked flavour, little aftertaste, more milky, salty taste | Thinner (6), more astringent, less astringent, less solid like, creamy mouthfeel, watery (4) |

* Numbers in brackets indicate the number of panellists (if more than one) who made the same comment.

Calcium Depleted Sports Beverages

All 12 panellists grouped the samples correctly. Sample comments for the groupings are shown in Table 25.

TABLE 25

Comments for sample groupings for 9.6% protein calcium depleted samples from liquid MPC or MPC powder.

| Sample | Comments on appearance | Comment on flavour and aftertaste | Comments on texture |
|---|---|---|---|
| Sports beverage Calcium depleted MPC powder | Pale yellow colour (4) | Salty taste (4), different flavour profile, creamier, cleaner flavour, stronger protein flavour, cooked flavour, cardboard flavour, bland flavour | Slight mouthcoating (3), thicker (10), slimy (2), more mouthfeel (2), paste like texture |
| Sports beverage liquid Calcium depleted MPC | Lighter white colour (5) | Bland (2), not much flavour, protein flavour, less salty, less aftertaste, cleaner flavour, less protein flavour, different cooked flavour, burnt flavour, salty taste, dairy flavour | Watery (4), no mouthcoating, thinner (5), powdery |

\* Numbers in brackets indicate the number of panellists (if more than one) who made the same comment.

Example 9

This example describes the process to form the heat-treated liquid milk protein concentrate using microfiltration.

Skim milk is concentrated to 15% TS at 50° C. on a batch Tetra Alcross MFS-19 microfiltration plant equipped with 0.1 µm Membralox ceramic membranes. Diafiltration water is applied until the casein:whey protein ratio is increased from 4:1 to 9:1. The resulting MF retentate is then be further concentrated on a 5 kDa UF membrane at 10° C. until the protein concentration in the retentate reaches 14%. The resulting MF retentate is then processed through a Tetra Pak LHT plant with a holding time of 144° C. for 5 seconds then cooled to 20° C. and aseptically packed.

The MPC produced is assessed using the methods described herein.

Example 10

This example describes the use of the heat-treated liquid milk protein concentrate compared to a powdered milk protein concentrate in the production of a yoghurt/fermented milk.

1. A high protein yoghurt (5% protein) from liquid MPC is prepared as follows:
2. Skim milk powder (107.5 g) was added to 784 g 60° C. water and liquid MPC (108.0 g) was added once the powder was dissolved.
3. Optionally, a blend of stabilisers and/or carbohydrates (not present in current formulations) is added and mixed for 10 minutes.
4. Cream (not present in current formulations)) is added and mixed for 10 minutes.
5. Cream can be added to achieve a final fat content of 0-10% fat and sugar can be added to achieve a final sugar content of 0-10%.
6. The premix is homogenised at 60° C., 150/50 bar.
7. The homogenised mix is heat treated at 95° C./5 minutes to denature the whey protein.
8. The homogenised mix is cooled to 42° C.
9. The homogenised mix is inoculated with starter culture (0.2 g), i.e. *Lactobacillus bulgaricus* and *Streptococcus thermophilus* or mesophilic bacteria (to produce a petit Suisse/fromage fraise type cheese)
10. The homogenised mix is fermented at 42° C. until a pH of 4.2 is reached.
11. The yoghurt is cooled to 20° C.
12. The yoghurt is smoothed using a high shear mixer.
13. The yoghurt is cooled and packed.

A high protein yoghurt from powdered MPC is prepared as follows:

1. A dry blend of skim milk powder (107.5 g) and MPC powder (18.5 g) was added to 873.8 g 60° C. water and mixed for 60 minutes.
2. Carry out steps 2-12 of the process for the liquid MPC above.

The yoghurts may be prepared using the following ingredients.

TABLE 26

Composition of yoghurts

| Ingredients (g) | 4% protein | | 6% protein | | 8% protein | | 10% protein | |
|---|---|---|---|---|---|---|---|---|
| | Powder | Liquid | Powder | Liquid | Powder | Liquid | Powder | Liquid |
| Skim milk powder | 107.5 | 107.5 | 107.5 | 107.5 | 107.4 | 107.4 | 107.4 | 107.4 |
| MPC powder | 6.1 | 0 | 30.7 | 0 | 55.4 | 0 | 80 | 0 |
| Liquid MPC (14% protein) | 0 | 36 | 0 | 178.5 | 0 | 322 | 0 | 468.6 |

TABLE 26-continued

| | Composition of yoghurts | | | | | | | |
|---|---|---|---|---|---|---|---|---|
| Ingredients | 4% protein | | 6% protein | | 8% protein | | 10% protein | |
| (g) | Powder | Liquid | Powder | Liquid | Powder | Liquid | Powder | Liquid |
| Culture | 0.2 | 0.2 | 0.2 | 0.2 | 0.2 | 0.2 | 0.2 | 0.2 |
| Water | 886.2 | 856.3 | 861.6 | 713.8 | 837 | 570.4 | 812.2 | 423.8 |
| Protein (%) | 4.00 | 4.01 | 6.00 | 6.00 | 8.01 | 8.01 | 10.01 | 10.06 |
| Total weight (g) | 1000 | 1000 | 1000 | 1000 | 1000 | 1000 | 999.8 | 1000 |

The prepared yoghurts may have the following range of macronutrients.

TABLE 27

Macronutrient composition of the yoghurts

| Macronutrient (g) | Per 100 g |
|---|---|
| Protein | 4-10 |
| Fat | 0.1-10 |
| Carbohydrates | 0.1-10 |

The flavour, viscosity, particle size, colour, pH, and TA of the yoghurts produced is assessed using the methods described herein.

Example 11

This example describes the use of the heat-treated liquid milk protein concentrate compared to a powdered milk protein concentrate in the production of a recombined cream.

I A recombined cream from liquid MPC is prepared as follows:
1. A dry blend of stabiliser (0.1 g guar gum) and preservative (0.1 g sorbic acid) is added to 43.79 g water at 60° C. under agitation.
2. Liquid MPC (15.31 g, 15% protein) is added to the water.
3. Melted fat (40 g) and emulsifiers (0.3 g polysorbate 60, 0.1 g glyceryl monostearate) are added to the premix and mixed with high shear to disperse the fat.
4. The premix is heated to 70° C.
5. The premix is pasteurised at 70° C. for 10 minutes or 85° C. for 15 seconds.
6. The premix is homogenised at 50 bar in two steps (35/15 bar).
7. The homogenised solution is cooled to 20° C.
8. The salt (0.2 g sodium chloride) is added.
9. The solution is packaged and stored chilled.

A recombined cream from powdered MPC is prepared as follows:
1. A dry blend of MPC powder (2.61 g), stabiliser and preservative are added to 56.49 g water at 60° C. under agitation.
2. The premix is hydrated for 30 minutes with constant agitation.
3. Carry out steps 3-9 of the process for the liquid MPC above.

The recombined creams may be used in preparing butter, whipping cream, and sour cream.

The recombined cream may be prepared using the following ingredients as shown in Table 28.

TABLE 28

| Ingredient composition of recombined cream | | |
|---|---|---|
| Ingredient (g) | 40% fat with MPC85 powder | 40% fat with liquid MPC |
| Anhydrous milkfat | 40 | 40 |
| MPC 85 powder | 2.61 | |
| Liquid MPC (14% protein) | | 15.31 |
| Polysorbate 60 | 0.3 | 0.3 |
| Glyceryl monostearate | 0.1 | 0.1 |
| Stabiliser | 0.2 | 0.2 |
| Salt | 0.2 | 0.2 |
| Preservative | 0.1 | 0.1 |
| Water | 56.49 | 43.79 |

The flavour, viscosity, particle size, sediment, and pH of the recombined creams produced is assessed using the methods described herein.

Example 12

This example describes the use of the heat-treated liquid milk protein concentrate compared to a powdered milk protein concentrate in the production of a high protein ice cream.

An ice cream from liquid MPC is prepared as follows:
1. Water (22.86 g) is combined with all ingredients (11.86 g anhydrous milk fat, 14.5 g sucrose, 0.35 g dairy minerals, 5.64 g lactose, 0.12 g mono- and diglycerides, 0.03 g polysorbate 80 and 0.2 g gum stabiliser blend), except for the liquid MPC. The mixture is heated to 83° C. to fully activate the gum stabilisers. The mixture is then cooled to 58° C.
2. The liquid MPC (44.44 g, 18%) is added to the mixture and mixed for 10 minutes.
3. The mixture is heated to 58° C. in a water bath and homogenised in a 2 stage homogeniser at 17.2 MPa/3.4 MPa. The mix is cooled to 15° C. and then to 4° C. The ice cream was aged for about 24 hours and then frozen in an ice cream batch freezer with a 22 L barrel.

An ice cream from powdered MPC is prepared as follows:
1. 50% of the total water in the formulation (28.9 g) is combined with all ingredients (as above) excluding the powdered MPC. This is heated to 83° C. to fully activate the gum stabilisers. The mixture is cooled to 60° C.
2. The protein powder (9.5 g) is hydrated in the remaining water (28.9 g) at a temperature of 40° C. for 60 minutes before being added to the rest of the ingredients.
3. Carry out step 3 of the process for the liquid MPC above.

The ice cream may be prepared using the following ingredients.

TABLE 29

Ingredient composition of ice cream

| Ingredients (g) | 4% protein from powder | 4% protein from liquid | 6% protein from powder | 6% protein from liquid | 8% protein from powder | 8% protein from liquid |
|---|---|---|---|---|---|---|
| water | 59.7 | 35.89 | 58.75 | 32.56 | 57.8 | 22.86 |
| AMF | 11.93 | 11.93 | 11.89 | 11.89 | 11.86 | 11.86 |
| sucrose | 16.7 | 16.7 | 15.6 | 15.6 | 14.5 | 14.5 |
| DM | 0.78 | 0.78 | 0.56 | 0.56 | 0.35 | 0.35 |
| Lactose | 5.78 | 5.78 | 5.71 | 5.71 | 5.64 | 5.64 |
| MPC 85 powder | 4.76 | | 7.14 | | 9.5 | |
| liquid MPC (14%) | | 28.57 | | | | |
| liquid MPC (18%) | | | | 33.33 | | 44.44 |
| MDG | 0.12 | 0.12 | 0.12 | 0.12 | 0.12 | 0.12 |
| PS80 | 0.03 | 0.03 | 0.03 | 0.03 | 0.03 | 0.03 |
| gum stabiliser | 0.2 | 0.2 | 0.2 | 0.2 | 0.2 | 0.2 |

AMF: anhydrous milkfat, DM: dairy minerals, MDG: mono- and diglycerides PS80: polysorbate 80.

The flavour, viscosity, particle size, over run, and melt rate of the ice creams produced is assessed using the methods described herein.

Example 13

This example describes the use of the heat-treated liquid milk protein concentrate compared to a powdered milk protein concentrate in the production of a high protein pudding.

A high protein pudding from liquid MPC is prepared as follows:
1. A dry blend of stabilisers (0.02 g Carrageenan Ticaloid 710 H Tic, 0.05 g xanthan FASTir TIC), carbohydrates (2.6 g sucrose) and sweeteners (0.01 g sucralose, 0.015 g acesulfame K) is added to 7.5 g 50° C. water and sheared for 5 minutes.
2. The liquid MPC (85.7 g, 15.2% protein) is added to the premix.
3. Canola oil (3.1 g) is added.
4. 0.82 g of starch (Ingredion Texflo) is dissolved in 7.5 g water and the slurry is added.
5. The premix is homogenised at 60° C., 150/50 bar.
6. The homogenised mix is UHT sterilised at 143° C./5 sec after pre-heating to 75° C.
7. The homogenised mix is cooled and packed.

A high protein pudding from powdered MPC is prepared as follows:
1. Antifoam (Xiameter® AFE-1520 Antifoam Emulsion) is added to 75.15 g of 50° C. water.
2. A dry blend of stabilisers (as above), carbohydrates and sweeteners are added the water and sheared for 5 minutes.
3. The MPC powder (18.02 g) is hydrated in the solution for 20 minutes at 50° C.
4. Carry out steps 3-7 of the process for the liquid MPC above.

The production of the high protein pudding from the liquid MPC requires less time for hydrating the liquid MPC versus the powder (about 10 minutes versus 60 minutes), and there is the elimination of potential undissolved powder particles, no foaming occurs when hydrating liquid versus powder therefore the use of antifoam is not required for liquid.

The puddings may be prepared using the following ingredients.

TABLE 30

Ingredient composition of puddings.

| Ingredient (g) | From powder | From liquid |
|---|---|---|
| Water | 75.15 | 7.5 |
| MPC 470 | 14.3 | |
| MPC4861 | 3.72 | |
| UHT liquid MPC (15.2%) | | 85.7 |
| Canola oil | 3.1 | 3.1 |
| Sugar | 2.6 | 2.6 |
| Stabilisers | 0.02 | 0.02 |
| sweeteners | 0.025 | 0.025 |
| antifoam | 0.003 | 0 |
| Starch | 0.82 | 0.82 |
| Flavours | 0.26 | 0.26 |
| Protein % | 13.02 | 13.02 |
| Total | 99.998 | 99.825 |

The prepared puddings may have the following range of macronutrients.

TABLE 31

Macronutrient content of puddings

| Macronutrient (g) | Per 100 g |
|---|---|
| Protein | 10-13 |
| Fat | 0.1-2.2 |
| Carbohydrates | 0.1-5.5 |

The flavour, particle size, pH, and firmness/texture of the puddings produced is assessed using the methods described herein.

Example 14

This example describes the use of the heat-treated liquid milk protein concentrate compared to a powdered milk protein concentrate in the production of a fresh cheese.

A fresh cheese from liquid MPC is prepared as follows:
1. Milk fat (45 g) and hydrogenated vegetable oil (135 g) is melted in a tank with an agitator.
2. Liquid MPC (804.28 g, 18.7% protein) is added at 45° C.
3. The premix is pasteurised for 30 minutes at 65° C.
4. The premix is homogenised at 34.5 bar at 60-65° C.
5. The homogenised mix is cooled to 45° C. and a blend of salts (13 g NaCl, 1.3 g calcium chloride), stabilisers (1.2 g, Palsgaard 5926) and flavours (0.1 g milk flavour, Firmenich) are added.
6. Rennet (0.0125 g DPL 911 mesophilic culture) is added.
7. The homogenised mix is filled into moulds and set for 30 minutes.
8. The cheese is packaged and refrigerated.

A fresh cheese from liquid MPC is prepared as follows:
1. Milk fat (45 g) and hydrogenated vegetable oil (135 g) is melted in a tank with an agitator.
2. Water (588.89 g) is added to the tank and the protein powder (214.3 g) is dissolved.
3. The base is hydrated for 40 minutes at 45° C.
4. Carry out steps 3-8 of the process for the liquid MPC above.

The fresh cheese may be prepared using the following ingredients:

TABLE 32

Ingredient composition of fresh cheese

| Ingredient (g) | From powder | From liquid |
|---|---|---|
| Liquid MPC (18.7%) | | 804.28 |
| MPC70 | 214.3 | |
| Hydrogenated vegetable oil | 135 | 135 |
| Anhydrous milk fat | 45 | 45 |
| Stabilisers | 1.2 | 1.2 |
| Salts | 14.5 | 14.5 |
| Rennet | 0.0125 | 0.0125 |
| Water | 589.99 | 0 |
| Protein (%) | 15 | 15 |
| Total (g) | 1000 | 1000 |

The prepared fresh cheeses may have the following range of macronutrients:

TABLE 33

Macronutrient content of fresh cheeses

| Macronutrient (g) | Per 100 g |
|---|---|
| Protein | 11-25 |
| Fat | 4-25 |
| Carbohydrates | 0.1-4 |

The flavour, pH, colour and firmness/texture of the cheese produced is assessed using the methods described herein.

Example 15

This example describes the use of a heat-treated liquid milk protein concentrate compared to a powdered milk protein concentrate in the production of a processed cream cheese.

A processed cream cheese containing 7.5% protein from 15.4% protein liquid milk protein concentrate produced by microfiltration is prepared as follows:
1. 980 g of liquid milk protein concentrate (for example, the liquid MPC described in Example 4), 396 g water and 600 g of anhydrous milkfat are added to a Thermomix and heated and mixed at 50° C. for 10 minutes.
2. The solution is pH adjusted to pH 5.8 using about 24 g of a mixture of lactic and citric acid at a ratio of 0.67:0.33.
3. The solution is heated to 90° C. and held for 10 minutes at high shear.
4. The product is hot filled into 250 mL PET containers at greater than 73° C.
5. The product is chilled immediately.

A processed cream cheese containing 7.5% protein from 1.3% protein liquid milk protein concentrate produced by ultrafiltration is prepared as follows:
1. 830 g of liquid milk protein concentrate (Sample 5, Table 1), 570 g water and 600 g of anhydrous milkfat are added to a Thermomix and heated and mixed at 50° C. for 10 minutes.
2. Perform steps 2 to 5 of the liquid milk protein concentrate above.

A processed cream cheese from powdered milk protein concentrate is prepared as follows:
1. 600 g anhydrous milkfat is added to a Thermomix and heated and mixed at 50° C. for 2 minutes.
2. 186 g of powdered milk protein concentrate, 1190 g water and 600 g anhydrous milkfat is added and mixed at 50° C. for 10 minutes.
3. Perform steps 2 to 5 of the liquid micellar casein above.

The ingredient composition of the cream cheese products is shown in Table 34.

TABLE 34

Ingredient composition of cream cheeses.

| | MPC ingredient | | |
|---|---|---|---|
| Ingredients | Liquid (example 4) | Liquid (Sample 5, Table 1) | Powder |
| Water (g) | 396 | 546 | 1190 |
| MPC powder (g) | | | 186 |
| Liquid milk protein concentrate (Example 4) (g) | 980 | | |
| Liquid milk protein concentrate (Sample 5, Table 1) (g) | | 830 | |
| Anhydrous milkfat (g) | 600 | 600 | 600 |
| Lactic (10%)/citric acid (10%) | 15.9 mL/7.9 mL | 15.9 mL/7.9 mL | 15.9 mL/7.9 mL |

The macronutrient content of the cream cheese products is shown in Table 35.

TABLE 35

Macronutrient content of cream cheeses.

| | MPC ingredient | | |
|---|---|---|---|
| Composition (%) | Liquid (example 4) | Liquid (Sample 5, Table 1) | Powder |
| Protein | 7.57 | 7.60 | 7.54 |
| Fat | 30.11 | 30.11 | 30.11 |
| Total solids | 38.91 | 38.53 | 38.75 |
| pH | 5.85 | 5.85 | 5.85 |

A sensory evaluation of the texture, colour and flavour of the cream cheese products is performed using the methods described herein.

Example 16

This example describes the use of the heat-treated liquid milk protein concentrate compared to a powdered milk protein concentrate in the production of a protein fortified white milk.

A protein fortified milk comprising 8.2% protein is prepared from 15.4% protein liquid milk protein concentrate produced by microfiltration is as follows:
1. 1164 g of water and 630 g of liquid milk concentrate (Example 4) is recombined at ambient and heated to 50° C.
2. 206 g of skim milk powder is added to the solution and mixed for 30 minutes.
3. The mix is UHT sterilised at 145° C. for 5 sec after pre-heating to 80° C. to achieve sterility for at least 9 months at ambient.

A protein fortified milk comprising 8.2% protein is prepared from 18.3% protein liquid milk protein concentrate (Sample 5, Table 1) produced by ultrafiltration is as follows:
1. 1270 g of water and 524 g of liquid milk concentrate (Sample 5, table 1) is recombined at ambient and heated to 50° C.
2. Perform steps 2 to 3 of the liquid milk protein concentrate above.

A protein fortified white milk comprising 8.2% protein is prepared from powdered micellar casein as follows:
1. 206 g skim milk powder and 120 g micellar casein are slowly added to 1674 g water heated to 50° C. and mixed for 60 minutes.
2. The mix is UHT sterilised at 145° C. for 5 sec after pre-heating to 80° C. to achieve sterility for at least 9 months at ambient.

The ingredient composition and macronutrient content of the fortified milks is shown below.

TABLE 36

Ingredient composition of fortified milks

| Ingredient | MPC ingredient | | |
|---|---|---|---|
| | Liquid (example 4) | Liquid (Sample 5, Table 1) | Powder |
| Water | 1164 | 1270 | 1674 |
| Skim milk powder | 206 | 206 | 206 |
| Liquid milk protein concentrate (Example 4) | 630 | | |
| Liquid milk protein concentrate (Sample 5, Table 1) | | 524 | |
| MPC powder | | | 120 |

TABLE 37

Macronutrient content of fortified milks.

| Composition (%) | MPC ingredient | | |
|---|---|---|---|
| | Liquid (example 4) | Liquid (sample 5, table 1) | Powder |
| Protein | 8.23 | 8.23 | 8.22 |
| Carbohydrates | 6.06 | 5.83 | 5.62 |
| Fat | 0.19 | 0.13 | 0.18 |
| Total solids | 15.66 | 15.42 | 15.58 |

A sensory evaluation of the texture, flavour, pH, viscosity, sediment and colour of the fortified milks is performed using the methods described herein.

Any documents referred to herein including, but not limited to, patents, patent applications, journal articles, books, and the like, are incorporated herein by reference in their entirety. Any section headings used herein are for organizational purposes only and are not to be construed as limiting the subject matter described.

Although the invention has been described by way of example and with reference to particular embodiments, it is to be understood that modifications and/or improvements may be made without departing from the scope or spirit of the invention.

INDUSTRIAL APPLICATION

The liquid milk protein concentrates described herein are useful for the production of high protein food products, including liquid nutritional compositions, yoghurts, ice creams, dairy beverages including sports beverages and fortified milks, puddings, recombined creams, and fresh cheeses.

The invention claimed is:

1. A method for preparing a protein-containing food product, the method comprising
    a) providing a liquid milk protein concentrate prepared by a method comprising subjecting fresh, liquid milk to ultrafiltration or microfiltration or a combination thereof to produce a retentate, wherein the retentate has been subjected to an ultra high temperature (UHT) heat treatment having an $F_0$ value of at least 3.0, wherein the UHT heat treatment is carried out at 135 to 155° C. for 0.1 to 20 seconds, wherein the fresh, liquid milk is not subjected to a heat treatment equal to or greater than 81° C. prior to ultrafiltration or microfiltration, the liquid milk protein concentrate comprising
        i) at least about 9% total protein by weight, and
        ii) at least about 75% total protein by weight relative to total solids non-fat, wherein the milk protein concentrate has no added stabilisers or mouthfeel enhancers, and
    wherein the milk protein concentrate after storage for at least about one month at a temperature of about 20° C.
        i) exhibits no observable gelation or aggregation,
        ii) comprises less than about 5% by weight sediment,
        iii) has a whiteness index value of at least about 70, and
        iv) has a viscosity of less than about 950 mPa·s when measured at a temperature of 20° C. and a shear rate of 100 $s^{-1}$, and
    b) mixing the milk protein concentrate with one or more additional ingredients to produce the protein-containing food product.

2. The method of claim 1, wherein the method comprises holding the milk protein concentrate at a temperature of at least about 10° C. for at least about 3 days.

3. The method of claim 1, wherein the milk protein concentrate is not reconstituted.

4. The method of claim 1, wherein the protein-containing food product comprises at least about 1%, 1.5%, 2% or 2.5% total protein by weight.

5. The method of claim 1, wherein the method comprises mixing the milk protein concentrate with:
    a. one or more additional ingredients selected from a lipid, a carbohydrate, flavour, vitamin, mineral, fibre, thickening agent, emulsifier, stabiliser, food additive, colour, protein, or any combination of two or more of these ingredients;
    b. at least one source of lipid and at least one source of carbohydrate to prepare a liquid nutritional composition;
        i) at least one additional ingredient selected from the group comprising one or more milk powders, liquid milk and lactose powder, and
        ii) a yoghurt starter culture, to produce a yoghurt mix, and allowing the yoghurt mix to ferment to prepare a yoghurt;
    c. liquid milk or a milk powder, or a combination thereof to produce a dairy beverage; or
    d. one or more additional ingredients selected from the group comprising one or more flavour agents, a sweetener, one or more colouring agents, one or more stabilisers, an acidity regulator, one or more vitamins, one or more minerals, and one or more enzymes to produce a sports beverage.

6. The method of claim 1, wherein the protein-containing food product is a liquid nutritional composition, a beverage, ice cream, acidified/fermented milk, cheese, a pudding, a frozen dessert, coffee whitener, foam layer in a biscuit or in chocolate, a cream, or a gel.

7. The method of claim 1, wherein providing the liquid milk protein concentrate comprises:
  a. providing fresh, liquid milk,
  b. subjecting the fresh, liquid milk to microfiltration or ultrafiltration to produce a retentate, and
  c. subjecting the retentate to an ultra high temperature (UHT) heat treatment having an $F_0$ value of at least 3.0, wherein the UHT heat treatment is carried out at 135 to 155° C. for 0.1 to 20 seconds, to prepare a milk protein concentrate, wherein the fresh, liquid milk is not subjected to a heat treatment equal to or greater than 81° C. prior to ultrafiltration or microfiltration, the milk protein concentrate comprising
    at least about 14.5% total protein by weight and at least about 75% total protein by weight relative to total solids non-fat,
    wherein the milk protein concentrate has no added stabilisers or mouthfeel enhancers, and
    wherein the milk protein concentrate after storage for at least about one month at a temperature of about 20° C.
      i) exhibits no observable gelation or aggregation,
      ii) comprises less than about 5% by weight sediment,
      iii) has a whiteness index value of at least about 70, and
      iv) has a viscosity of less than about 950 mPa·s when measured at a temperature of 20° C. and a shear rate of 100 s$^{-1}$.

8. The method of claim 7, wherein the fresh liquid milk is whole milk or skim milk.

9. The method of claim 7, wherein
  the retentate is subjected to diafiltration to produce a diafiltered retentate before heat treatment or
  the method comprises directly subjecting the retentate, or diafiltered retentate, to the heat treatment.

10. The method of claim 7, wherein the milk protein concentrate does not comprise
  added non-dairy ingredients.

11. The method of claim 7, wherein the milk protein concentrate comprises at least about 15%, 15.5% or 16% total protein by weight.

12. The method of claim 7, wherein the milk protein concentrate
  a) after storage for at least about three months at a temperature of about 30° C.
    i) exhibits no observable gelation or aggregation,
    ii) comprises less than about 5% by weight sediment, and
    iii) has a whiteness index value of at least about 70;
  b) after storage for at least about three months at a temperature of about 4° C.
    i) exhibits no observable gelation or aggregation,
    ii) comprises less than about 5% by weight sediment, and
    iii) has a whiteness index value of at least about 70.

* * * * *